(12) United States Patent
Chung et al.

(10) Patent No.: US 12,512,131 B2
(45) Date of Patent: Dec. 30, 2025

(54) MEMORY DEVICE, METHOD, LAYOUT, AND SYSTEM

(71) Applicant: TAIWAN SEMICONDUCTOR MANUFACTURING COMPANY, LTD., Hsinchu (TW)

(72) Inventors: Yen Lin Chung, Hsinchu (TW); Kao-Cheng Lin, Hsinchu (TW); Wei Min Chan, Hsinchu (TW); Yen-Huei Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 388 days.

(21) Appl. No.: 18/325,861

(22) Filed: May 30, 2023

(65) Prior Publication Data

US 2024/0251541 A1    Jul. 25, 2024

Related U.S. Application Data

(60) Provisional application No. 63/481,299, filed on Jan. 24, 2023.

(51) Int. Cl.
| | |
|---|---|
| *G11C 5/06* | (2006.01) |
| *G06F 30/392* | (2020.01) |
| *G11C 11/419* | (2006.01) |
| *H10B 10/00* | (2023.01) |
| *H10D 89/10* | (2025.01) |

(52) U.S. Cl.
CPC .......... *G11C 5/063* (2013.01); *G06F 30/392* (2020.01); *G11C 11/419* (2013.01); *H10B 10/12* (2023.02); *H10B 10/18* (2023.02); *H10D 89/10* (2025.01)

(58) Field of Classification Search
CPC ....... H10B 10/12; H10B 10/18; G06F 30/392; G11C 11/419; G11C 5/063; H10D 89/10
See application file for complete search history.

(56) References Cited

U.S. PATENT DOCUMENTS

| | | | |
|---|---|---|---|
| 2012/0281464 A1 | 11/2012 | Chung et al. | |
| 2016/0225753 A1* | 8/2016 | Chang | G06F 30/392 |
| 2019/0295656 A1* | 9/2019 | Clinton | G11C 16/26 |
| 2019/0393223 A1 | 12/2019 | Sharma et al. | |

(Continued)

FOREIGN PATENT DOCUMENTS

| | | |
|---|---|---|
| TW | 201835910 | 10/2018 |
| TW | 2020047494 | 1/2020 |
| TW | 202029195 | 8/2020 |

*Primary Examiner* — Joseph C. Nicely
(74) *Attorney, Agent, or Firm* — Hauptman Ham, LLP

(57) ABSTRACT

A memory macro includes an input/output (I/O) circuit positioned in a semiconductor wafer, a column of memory cells including first and second subsets of contiguous memory cells extending away from the I/O circuit in the semiconductor wafer, wherein the first subset is positioned between the I/O circuit and the second subset, a first bit line coupled to the I/O circuit and extending on one of a frontside or a backside of the semiconductor wafer along the first subset and terminating at the second subset, and a second bit line coupled to the I/O circuit and extending on the other of the frontside or the backside along the first and second subsets. Each memory cell of the first subset is electrically connected to the first bit line, and each memory cell of the second subset is electrically connected to the second bit line.

20 Claims, 16 Drawing Sheets

(56) References Cited

U.S. PATENT DOCUMENTS

| 2020/0227476 | A1* | 7/2020 | Tomita | G11C 13/0007 |
| 2021/0343332 | A1* | 11/2021 | Chiu | H10D 30/62 |
| 2022/0130455 | A1* | 4/2022 | Jain | G11C 11/419 |
| 2024/0064950 | A1* | 2/2024 | Chen | H10B 10/12 |

* cited by examiner

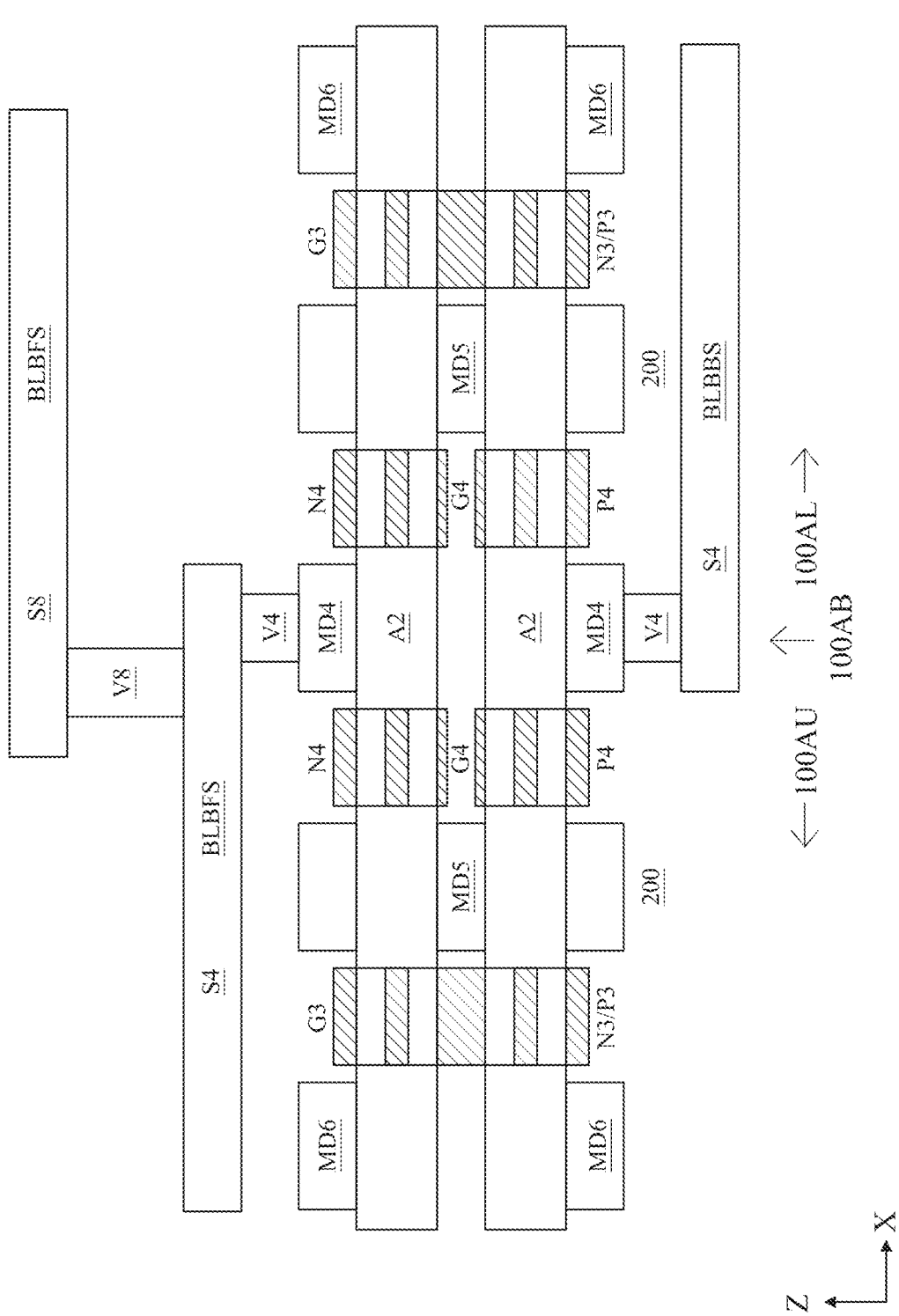

500

510 — Use one of a frontside or backside bit line to perform a first read or write operation on a memory cell of a first subset of a column of memory cells 520 — Use the other of the frontside or backside bit line to perform a second read or write operation on a memory cell of a second subset of the column of memory cells

MEMORY DEVICE, METHOD, LAYOUT, AND SYSTEM

PRIORITY CLAIM

The present application claims the priority of U.S. Provisional Application No. 63/481,299, filed Jan. 24, 2023, which is incorporated herein by reference in its entirety.

BACKGROUND

An integrated circuit (IC) typically includes a number of IC devices that are manufactured in accordance with one or more IC layout diagrams. IC devices sometimes include memory circuits in which information is stored as bits in individual memory cells. Types of memory cells can include static random-access memory (SRAM) cells in which multiple transistors are configured to be programmed in write operations and accessed in read operations. In some cases, the transistors are implemented as complementary field effect transistor (CFET) devices in which an upper FET overlies a lower FET in a stack configuration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A-4C are diagrams of an IC layout diagram and device, in accordance with some embodiments.

DETAILED DESCRIPTION

Figure 1:
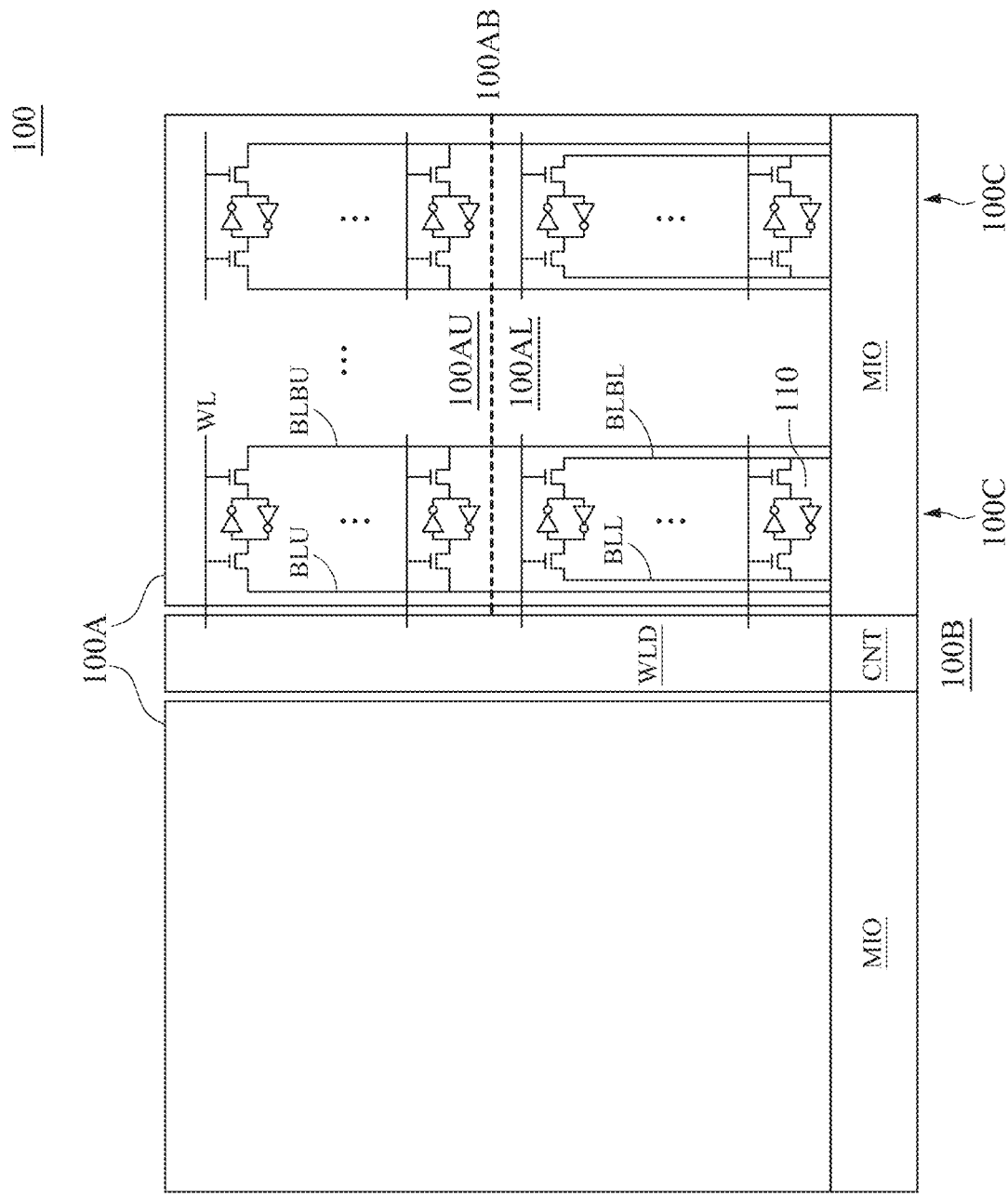
FIG. 1 is a diagram of a memory macro, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below." "lower," "above." "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a memory macro column includes first and second subsets of contiguous memory cells extending away from an input/output (I/O) circuit, one of a frontside or backside bit line electrically connected to the I/O circuit and the first subset and terminating at the second subset, and the other of the frontside or backside bit line extending beyond the first subset and electrically connected to the I/O circuit and the second subset. By dividing the bit line electrical connections into separate frontside and backside paths, parasitic resistive and capacitive bit line loading is reduced compared to other approaches such that speed and power performance are improved during read and write operations.

In some embodiments, the memory cells include static random-access memory (SRAM) cells including complementary field effect transistor (CFET) devices in which stacked pass gates are configured to separately connect adjacent cells to either a frontside or backside bit line, thereby enabling support of a continuous border between the first and second subsets. Memory cell density is thereby maintained compared to approaches in which a border between the first and second subsets does not include a cell capable of separate frontside and backside bit line connections.

Figure 2A:
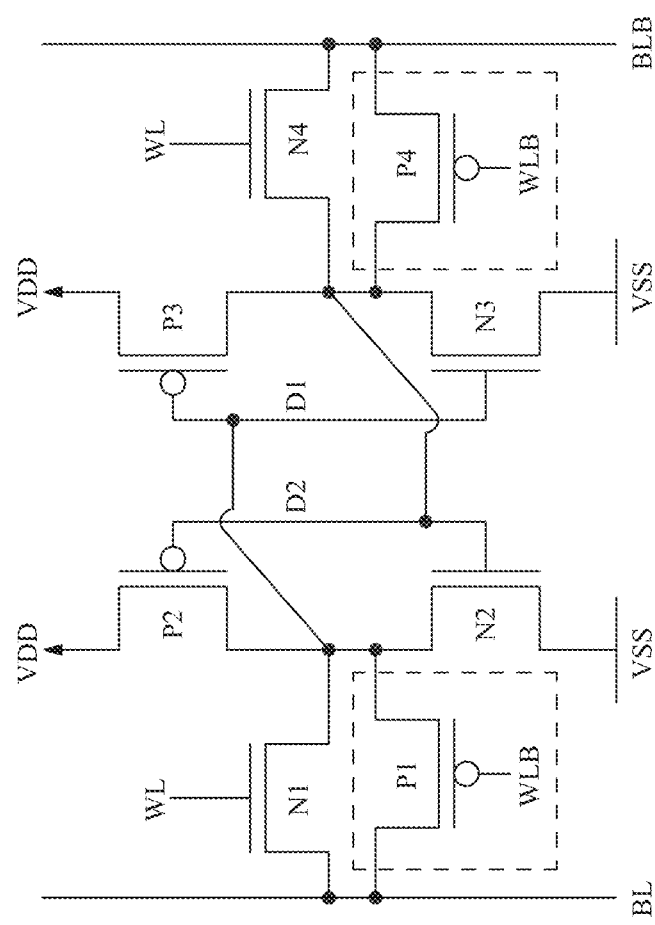
FIGS. 2A and 2B are diagrams of an IC layout diagram and device, in accordance with some embodiments.
Figure 2B:
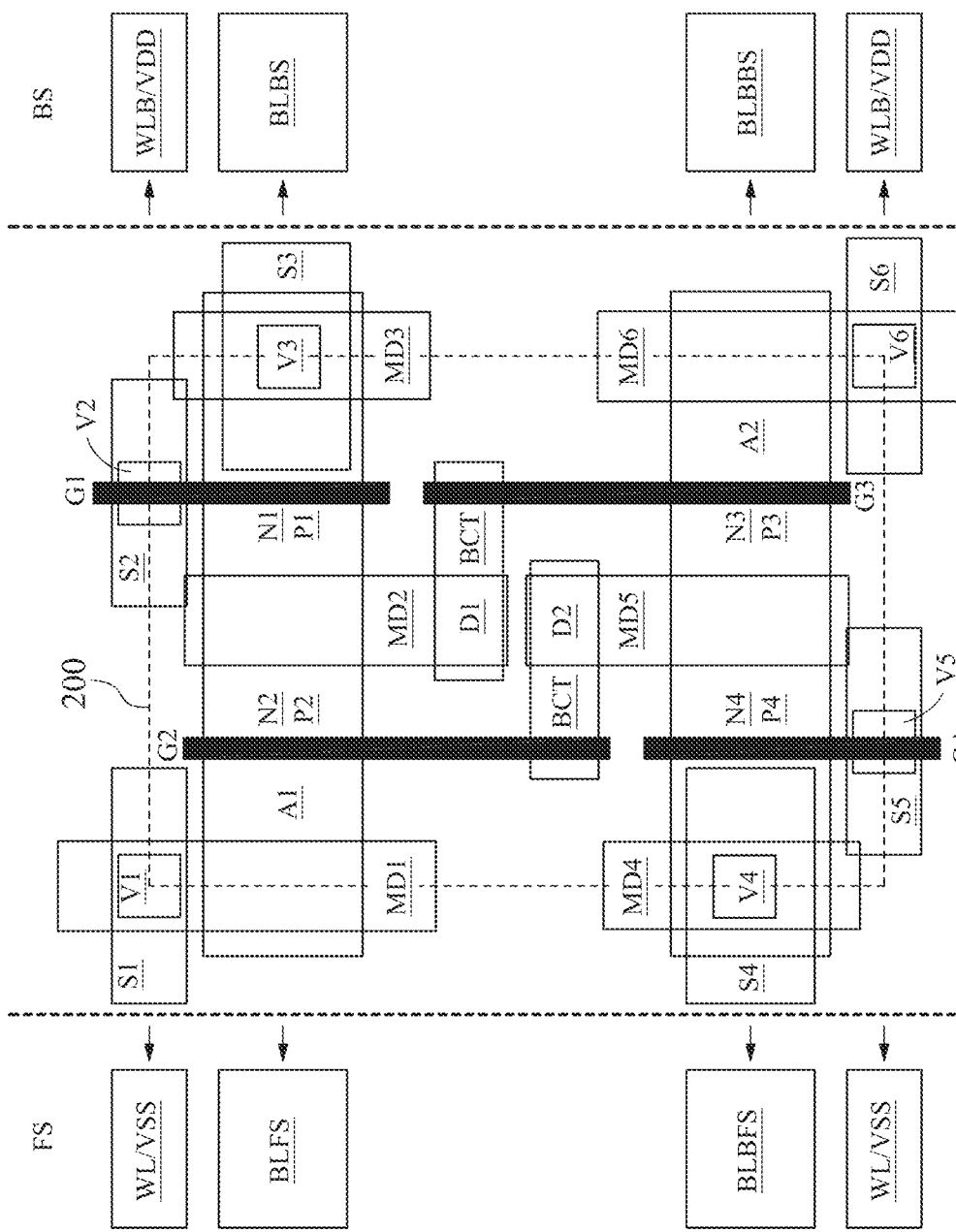
Figure 5:
FIG. 5 is a flowchart of a method of operating a memory macro, in accordance with some embodiments.
Figure 6:
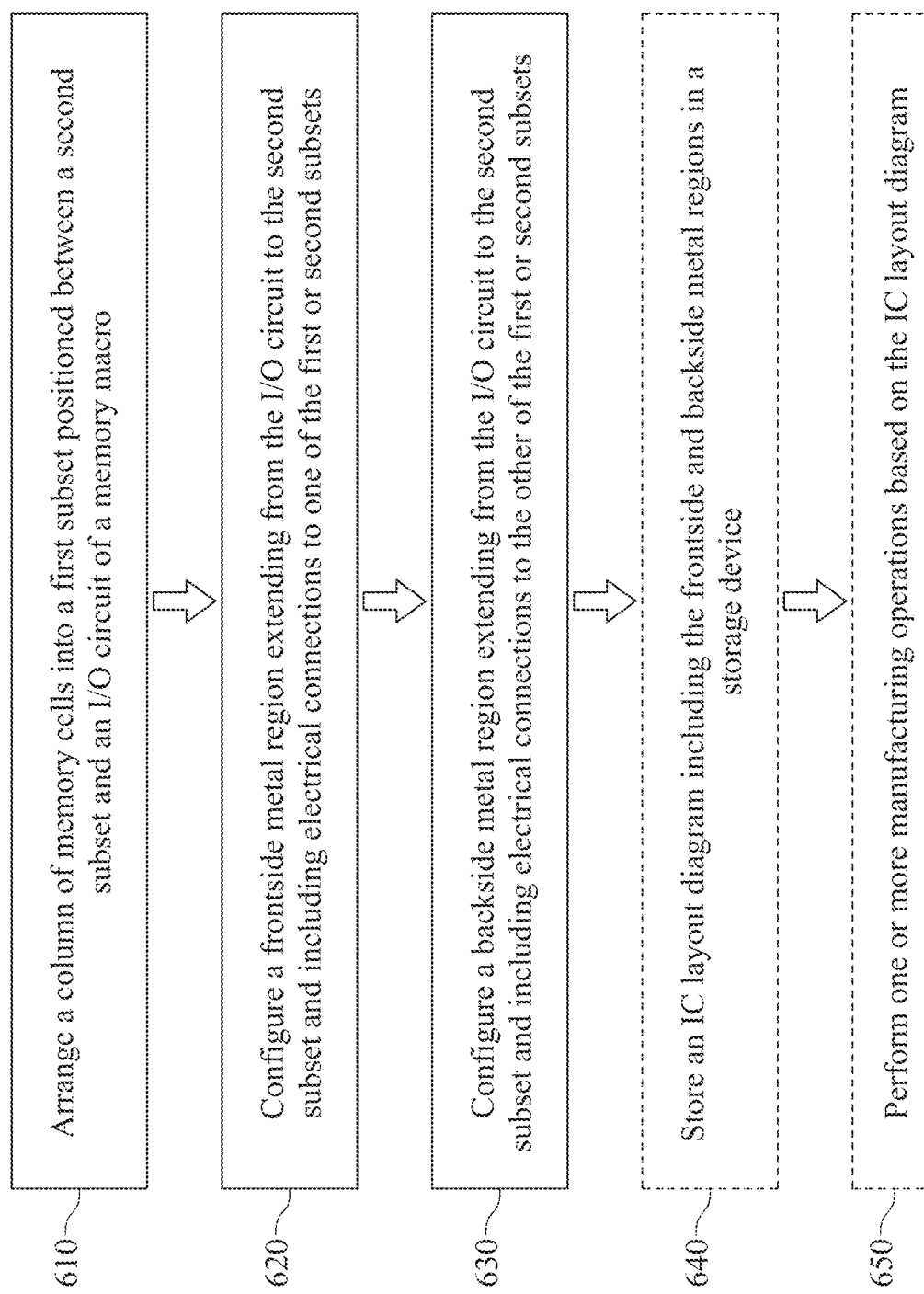
FIG. 6 is a flowchart of a method of generating an IC layout diagram, in accordance with some embodiments.
Figure 7:
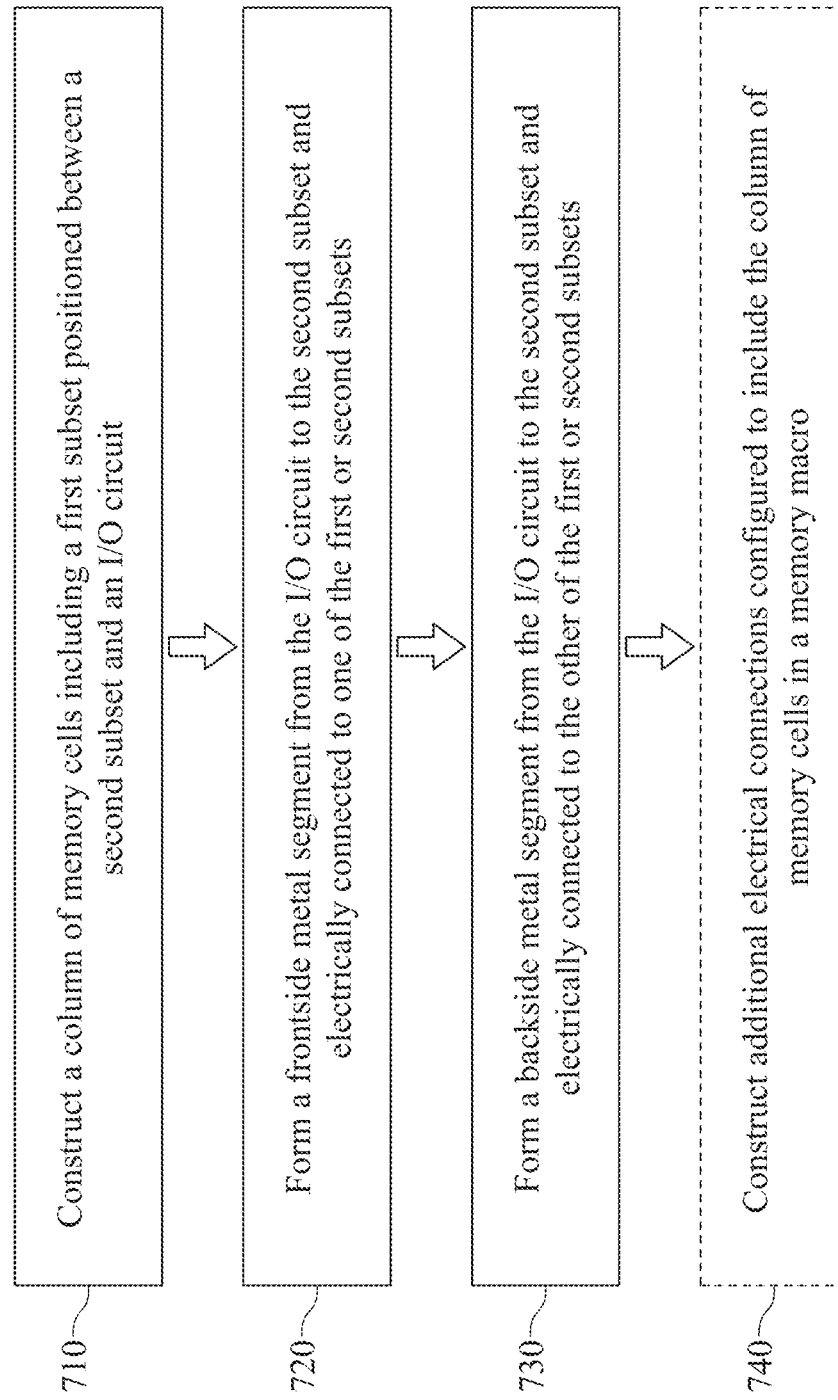
FIG. 7 is a flowchart of a method of manufacturing an IC device, in accordance with some embodiments.
Figure 8:
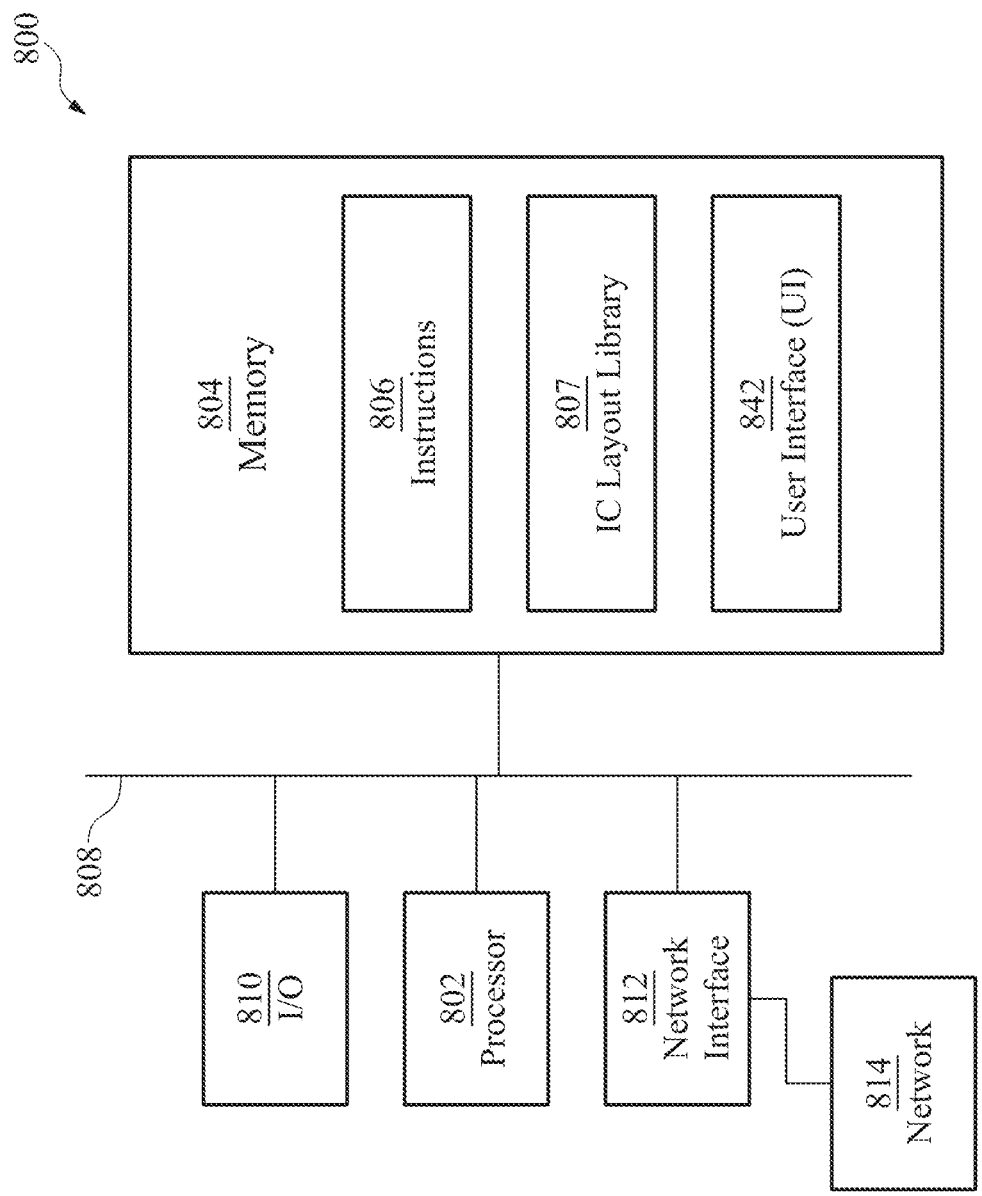
FIG. 8 is a block diagram of an IC layout diagram generation system, in accordance with some embodiments.
Figure 9:
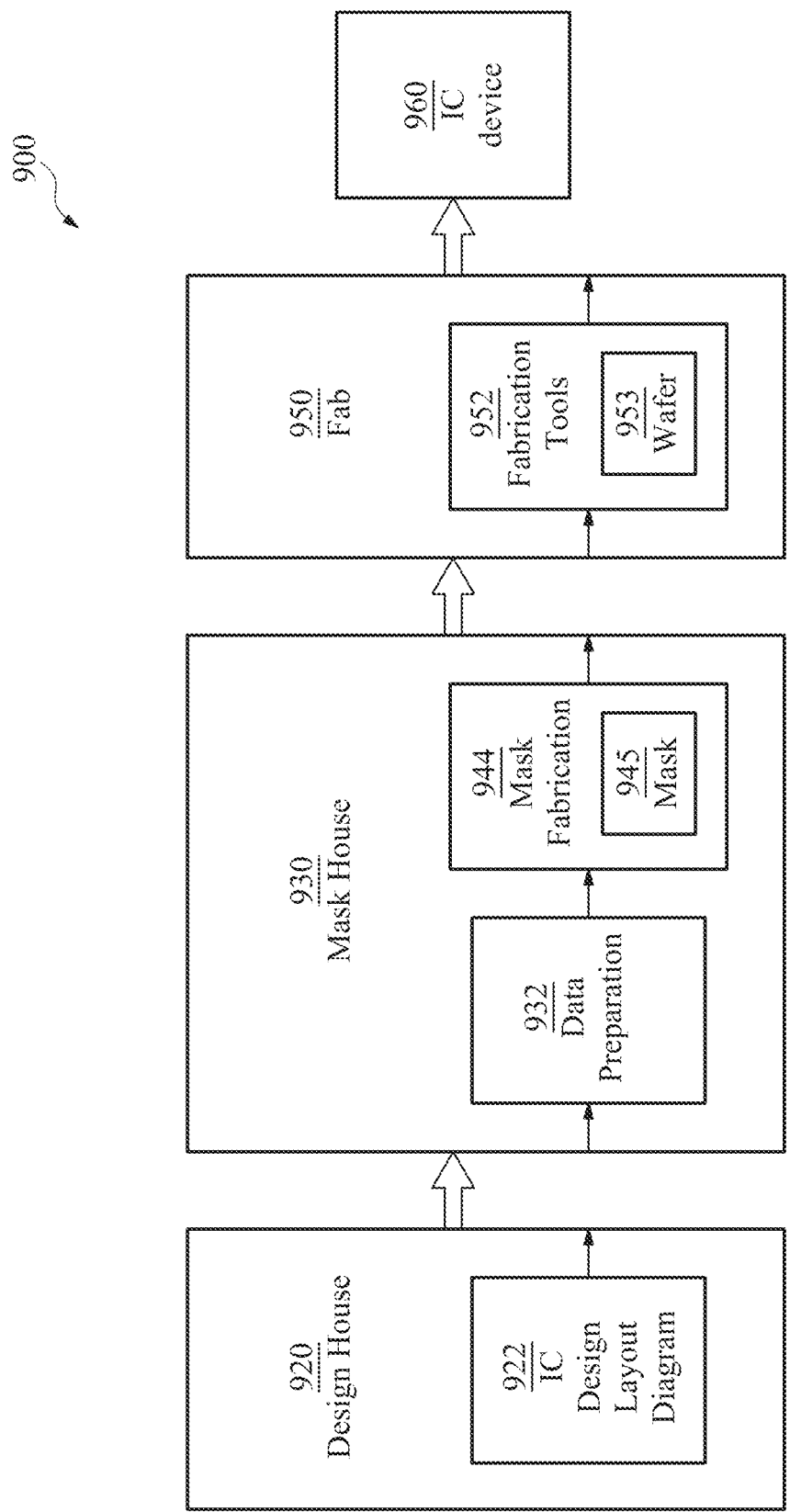
FIG. 9 is a block diagram of an IC manufacturing system, and an IC manufacturing flow associated therewith, in accordance with some embodiments.

FIG. 1 is a diagram of a memory macro 100, FIGS. 2A and 2B are a schematic diagram and plan view of an SRAM memory cell 200 and corresponding integrated circuit (IC) layout diagram 200 and device 200, and FIGS. 3A-4C depict embodiments of IC layout diagrams and corresponding IC devices in which a border between first and second memory cell subsets includes instances of memory cell 200, in accordance with various embodiments. In accordance with various embodiments, FIG. 5 depicts a method of operating memory macro 100, FIG. 6 depicts a method of generating an IC layout diagram, FIG. 7 depicts a method of manufacturing an IC device, FIG. 8 is a block diagram of an IC layout diagram generation system, and FIG. 9 is a block diagram of an IC manufacturing system and an associated IC manufacturing flow.

Each of the figures herein, e.g., FIGS. 1-4C, is simplified for the purpose of illustration. The figures depict IC structures, devices, and layout diagrams with various features included and excluded to facilitate the discussion below. In various embodiments, an IC structure, device and/or layout diagram includes one or more features corresponding to power distribution structures, metal interconnects, contacts, vias, gate structures, source/drain (S/D) structures, bulk connections, or other transistor elements, dielectric layers, isolation structures, or the like, in addition to the features depicted in FIGS. 1-4C.

In IC layout diagrams/devices 200-400, reference designators represent both IC device features and the IC layout features used to at least partially define the corresponding IC device features in a manufacturing process, e.g., method 700 discussed below with respect to FIG. 7 and/or the IC manufacturing flow associated with IC manufacturing system 900 discussed below with respect to FIG. 9. Accordingly, IC layout diagram/device 200 represents a plan view of both IC layout diagram 200 and corresponding IC device 200, and IC layout diagrams/devices 300 and 400 represent views of both IC layout diagrams 300 and 400 and corresponding IC devices 300 and 400.

FIG. 1 depicts memory macro 100 positioned in a semiconductor wafer 100B in a non-limiting example orientation with respect to X and Y directions. In some embodiments, semiconductor wafer 100B is referred to as a substrate 100B or wafer 100B.

Memory macro 100, also referred to as a memory circuit 100, IC 100, or circuit 100 in some embodiments, is a memory circuit including at least one array 100A of memory cells 110 configured to store data, and one or more circuits configured to control data input, output, and storage operations as discussed below. In some embodiments, memory cells 110 include static random-access memory (SRAM) cells. In various embodiments, SRAM cells include five-transistor (5T) SRAM cells, six-transistor (6T) SRAM cells, e.g., memory cells 200 discussed below, eight-transistor (8T) SRAM cells, nine-transistor (9T) SRAM cells, or SRAM cells having other numbers of transistors. In various embodiments memory cells 110 include dynamic random-access memory (DRAM) cells, read-only memory (ROM) cells, non-volatile memory (NVM) cells, or other memory cell types capable of storing data. The representation of memory cells 110 depicted in FIG. 1 is a non-limiting example provided for the purpose of illustration.

Memory macro 100 includes a local control circuit CNT, I/O circuits MIO, a word line driver WLD, and two instances of memory array 100A. In some embodiments, memory macro 100 includes fewer or greater than two instances of memory array 100A and correspondingly fewer or greater numbers of local control circuit CNT, local I/O circuits MIO, and/or word line driver WLD. In some embodiments, memory macro 100 includes one or more circuits in addition to those depicted in FIG. 1.

Local control circuit CNT is positioned between and electrically coupled to two instances of I/O circuit MIO, and positioned adjacent to word line driver WLD, which is positioned between and electrically coupled to two instances of memory array 100A. In various embodiments, memory macro structure 100 includes combinations of one or more of address, data, and/or signal lines (not shown), complementary bit line pairs BLL/BLBL and BLU/BLBU, word lines WL whereby a global control circuit (not shown), local control circuit CNT, I/O circuits MIO, word line driver WLD, and memory arrays 100A are electrically coupled to each other.

Each of the global control circuit, local control circuit CNT, I/O circuits MIO, and word line driver WLD is an IC configured to, in operation, perform operations whereby data are input to, output from, and stored in corresponding instances of memory cells 110 in each instance of memory array 100A responsive to various combinations of address, clock, control, and/or data signals (not shown).

In the embodiment depicted in FIG. 1, a representative instance of memory array 100A includes columns 100C (two instances depicted for the purpose of illustration) of memory cells 110, each column including a subset 100AU of contiguous memory cells 110 and a subset 100AL of contiguous memory cells 110 positioned between subset 100AU and I/O circuit MIO. In some embodiments, subsets 100AU and 100AL are collectively referred to as respective upper bank 100AU and lower bank 100AL. Subsets 100AU and 100AL are adjacent to each other at a border 100AB.

Each of bit lines BLL and BLBL is electrically connected to I/O circuit MIO and each instance of memory cell 110 included in subset 100AL, and extends along subset 100AL in the X direction up to and including the instance of memory cell 110 included in subset 100AL and adjacent to border 100AB. Each of bit lines BLL and BLBL is thereby considered to extend to border 100AB and/or subset 100AU, and/or to terminate at border 100AB and/or subset 100AU.

Each of bit lines BLU and BLBU is electrically connected to I/O circuit MIO and each instance of memory cell 110 included in subset 100AU, and extends along each of subsets 100AL and 100AU in the X direction up to and including the instance of memory cell 110 included in subset 100AU and farthest from I/O circuit MIO.

One of bit line pairs BLL/BLBL or BLU/BLBU is positioned on a frontside of semiconductor wafer 100B and the other of bit line pairs BLL/BLBL or BLU/BLBU is positioned on a backside of semiconductor wafer 100B.

In some embodiments, bit lines BLL and BLBL include metal segments positioned in a lowermost frontside metal layer or a lowermost backside metal layer, each of which extends from I/O circuit MIO along subset 100AL to border 100AB. In some embodiments, a lowermost frontside metal layer is referred to as a frontside metal zero layer and a lowermost backside metal layer is referred to as a backside metal zero layer.

In some embodiments, bit lines BLU and BLBU include metal segments positioned in the lowermost frontside metal layer or lowermost backside metal layer, each of which extends from I/O circuit MIO along each of subsets 100AL and 100AU.

In some embodiments, each of bit lines BLU and BLBU includes a first metal segment positioned in a frontside or backside metal layer higher than the lowermost frontside or backside metal layer, e.g., a third metal layer, also referred to as a metal two layer in some embodiments, that extends from I/O circuit MIO along subset 100AL to border 100AB, a second metal segment positioned in the corresponding lowermost frontside or backside metal layer that extends from border 100AB along each memory cell 110 of subset 100AU, and a via structure that electrically connects the first and second metal segments to each other.

In some embodiments, memory cells 110 include CFET-based memory cells 200 and the metal segments of bit line pairs BLL/BLBL and BLU/BLBU are arranged in accordance with the embodiments discussed below with respect to FIGS. 2B-4C. In some embodiments, memory cells 110 include memory cell features other than the CFET-based features of memory cells 200, and the metal segments of bit line pairs BLL/BLBL and BLU/BLBU are arranged in accordance with the corresponding bit line features of the embodiments discussed below with respect to FIGS. 2B-4C.

The total of two bit line pairs BLL/BLBL and BLU/BLBU included in each column 100C depicted in FIG. 1 are a non-limiting example provided for the purpose of illustration. In some embodiments, each column 100C includes a bit line configuration other than a total of two bit line pairs, e.g., a single bit line BLL positioned on one of the frontside or backside of semiconductor wafer 100B and a single bit line BLU positioned on the other of the frontside or backside of semiconductor wafer 100B.

Memory circuit 100 thereby includes instances of memory macro column 100C including subsets 100AL and 100AU of contiguous memory cells 110 extending away from I/O circuit MIO, one of a frontside or backside bit line BLL and/or BLBL electrically connected to I/O circuit MIO and subset 100AL and terminating at subset 100AU, and the other of the frontside or backside bit line BLU and/or BLBU extending beyond subset 100AL and electrically connected to I/O circuit MIO and subset 100AU. By including the bit line electrical connections divided into separate frontside and backside paths, parasitic resistive and capacitive bit line loading in circuit 100 is reduced compared to other approaches such that speed and power performance are improved during read and write operations.

FIG. 2A is a schematic diagram of 6T SRAM memory cell 200 and FIG. 2B is a plan view of corresponding IC layout diagram/device 200. Instances of memory cell 200 are usable as memory cell 110 discussed above with respect to FIG. 1.

As depicted in FIG. 2B, the transistors of memory cell 200 are configured as stacked CFET devices in which n-type FETs overlie p-type FETs. Other transistor configurations, e.g., stacked CFET devices in which p-type FETs overlie n-type FETs, are within the scope of the present disclosure.

Memory cell 200 includes n-type transistors N1-N6 and p-type transistors P1-P4 and, in some embodiments, P5 and P6, complementary bit lines BL and BLB, a power supply voltage node VDD configured to distribute a power supply voltage VDD, and a reference voltage node VSS configured to distribute a reference voltage VSS.

Each of transistors N1 and N4 includes a gate electrically connected to a word line WL and is thereby configured to receive a word line signal WL, and in some embodiments, each of transistors P1 and P4 includes a gate electrically connected to a word line WLB and is thereby configured to receive a word line signal WLB complementary to word line signal WL.

In some embodiments, transistors N1 and N4 and, if applicable, P1 and P4, are referred to as pass gates N1, N4, P1, and P4. In some embodiments, transistor pairs N1/P1 and N4/P4 are configured as transmission gates.

Transistors P2 and N2 are coupled in series between power supply voltage node VDD and reference voltage node VSS and include drain terminals coupled to each other at a node D1 and gates coupled to each other at a node D2. Transistors P3 and N3 are coupled in series between power supply voltage node VDD and reference voltage node VSS and include drain terminals coupled to each other at node D2 and gates coupled to each other at node D1. Transistor pairs P2/N2 and P3/N3 are thereby configured as cross-coupled inverters capable of, in operation, storing data as complementary bits on nodes D1 and D2.

Transistors N1 and N4 are coupled between bit lines BL and BLB and nodes D1 and D2, respectively, and are thereby configured to, in operation, selectively couple node D1 to bit line BL and node D2 to bit line BLB responsive to signal WL. In some embodiments, transistors P1 and P4 are coupled between bit lines BL and BLB and nodes D1 and D2, respectively, and are thereby configured to, in operation, selectively couple node D1 to bit line BL and node D2 to bit line BLB responsive to signal WLB.

As depicted in FIG. 2B, memory cell 200 (corresponding to the dashed border) includes transistors N1, N2, P1, and P2 positioned in a CFET active region/area A1 and transistors N3, N4, P3, and P4 positioned in a CFET active region/area A2. In various embodiments, CFET active regions/areas A1 and A2 correspond to transistors N1-N4 overlying respective transistors P1-P4 or transistors P1-P4 overlying respective transistors N1-N4.

The orientation of memory cell 200 with respect to the X and Y directions is a non-limiting example provided for the purpose of illustration. In some embodiments, an instance of memory cell 200 has an orientation other than that depicted in FIG. 2B, e.g., inverted with respect to the X direction. In some embodiments, a plurality of memory cells, e.g., subset 100AL or 100AU discussed above, includes instances of memory cell 200 having alternating orientations with respect to the X direction whereby adjacent instances of memory cell 200 share border portions (and corresponding features) extending along the Y direction, as further discussed below.

In some embodiments, e.g., IC layout diagrams/devices 300 and 400 discussed below, adjacent instances of memory cell 200 share a border corresponding to border 100AB discussed above.

Transistor pairs N1/P1, N2/P2, N3/P3, and N4/P4 include respective gate regions/structures G1-G4, and shared source/drain (S/D) regions/structures (not shown for the purpose of clarity) in the corresponding portions of active regions/areas A1 and A2 adjacent to gate regions/structures G1-G4. Each gate structure G1-G4 surrounds one or more channel portions (not shown for the purpose of clarity) of the corresponding active region/area A1 or A2 that extend in the X direction between the corresponding S/D regions/structures.

The shared S/D regions/structures are electrically connected as discussed below through metal-like defined (MD) regions/segments MD1-MD6 to each other and/or to via regions/structures V1, V3, V4, and V6 to metal regions/segments S1, S3, S4, and S6. Gate regions/structures G1 and G4 are electrically connected as discussed below through via regions/structures V2 and V5 to metal regions/segments S2 and S5. Gate regions/structures G2 and G3 are electrically connected to respective MD regions/segments MD5 and MD2 through instances of a butted contact region/structure BCT.

An active region/area, e.g., active region/area A1 or A2, is a region in the IC layout diagram included in a manufacturing process as part of defining an active area, also referred to as an oxide diffusion or definition (OD), in the semiconductor substrate, either directly or in an n-well or p-well region/area (not shown for the purpose of clarity), in which one or more IC device features, e.g., a channel portion and/or S/D structure, is formed. In some embodiments, an active area is an n-type or p-type active area of a corresponding n-type or p-type FET of a CFET device. In various embodiments, an active area (structure) includes one or more of a semiconductor material, e.g., silicon (Si), silicon-germanium (SiGe), silicon-carbide (SiC), or the like, a dopant material, e.g., boron (B), phosphorous (P), arsenic (As), gallium (Ga), or another suitable material.

In some embodiments, an active area is a region in an IC layout diagram included in the manufacturing process as part of defining a nano-sheet structure, e.g., a continuous volume of one or more layers of one or more semiconductor materials having either n-type or p-type doping. In some embodiments, a channel portion corresponds to a nano-sheet structure. In various embodiments, individual nano-sheet layers include a single monolayer or multiple monolayers of a given semiconductor material.

A S/D region/structure is a region in the IC layout diagram included in the manufacturing process as part of defining a S/D structure, also referred to as a semiconductor structure in some embodiments, configured to have a doping type opposite that of the corresponding active region/area. In some embodiments, a S/D region/structure is configured to have lower resistivity than an adjacent channel portion. In some embodiments, a S/D region/structure includes one or more portions having doping concentrations greater than one or more doping concentrations present in the corresponding channel portion. In some embodiments, a S/D region/structure includes epitaxial regions of a semiconductor material, e.g., Si, SiGe, and/or silicon-carbide SiC. In some embodiments, a S/D region/structure includes one or more MD regions/segments.

An MD region/segment is a conductive region in the IC layout diagram included in the manufacturing process as part of defining an MD segment, also referred to as a conductive segment or MD conductive line or trace, in and/or on the semiconductor substrate and capable of being electrically connected to an underlying S/D structure and/or underlying and/or overlying via structure. In some embodiments, an MD segment includes a portion of at least one metal layer, e.g., a contact layer, overlying and contacting the substrate and having a thickness sufficiently small to enable formation of an insulation layer between the MD segment and an overlying metal layer, e.g., the first metal layer. In various embodiments, an MD segment includes one or more of copper (Cu), silver (Ag), tungsten (W), titanium (Ti), nickel (Ni), tin (Sn), aluminum (Al) or another metal or material suitable for providing a low resistance electrical connection between IC structure elements, i.e., a resistance level below a predetermined threshold corresponding to one or more tolerance levels of a resistance-based effect on circuit performance.

In various embodiments, an MD segment includes a section of the semiconductor substrate and/or an epitaxial layer having a doping level, e.g., based on an implantation process, sufficient to cause the segment to have the low resistance level. In various embodiments, a doped MD segment includes one or more dopant materials having doping concentrations of about $1*10^{16}$ per cubic centimeter ($cm^{-3}$) or greater.

In some embodiments, a manufacturing process includes two MD layers, and an MD region/segment refers to either or both of the two MD layers in the manufacturing process. In some embodiments, an MD segment is configured to be electrically connected to the S/D structure of a single one of a p-type or n-type FET of a CFET device, and to be electrically isolated from the S/D structure of the other of the p-type or n-type FET of the CFET device. In some embodiments, an MD segment, also referred to as an MD local interconnect (MDLI) in some embodiments, is configured to be electrically connected to the S/D structures of both the p-type FET and the n-type FET of a CFET device.

A gate region/structure, e.g., a gate region/structure G1-G4, is a region in the IC layout diagram included in the manufacturing process as part of defining a gate structure. A gate structure is a volume including one or more conductive segments, e.g., a gate electrode, including one or more conductive materials, e.g., polysilicon, copper (Cu), aluminum (Al), tungsten (W), cobalt (Co), ruthenium (Ru), or one or more other metals or other suitable materials, substantially surrounded by one or more insulating materials, the one or more conductive segments thereby being configured to control a voltage provided to an adjacent gate dielectric layer.

A dielectric layer, e.g., a gate dielectric layer, is a volume including one or more insulating materials, e.g., silicon dioxide, silicon nitride ($Si_3N_4$), and/or one or more other suitable material such as a low-k material having a k value less than 3.8 or a high-k material having a k value greater than 3.8 or 7.0 such as aluminum oxide ($Al_2O_3$), hafnium oxide ($HfO_2$), tantalum pentoxide ($Ta_2O_5$), or titanium oxide ($TiO_2$), suitable for providing a high electrical resistance between IC structure elements, i.e., a resistance level above a predetermined threshold corresponding to one or more tolerance levels of a resistance-based effect on circuit performance.

A metal region/segment, e.g., a metal region/segment S1-S6 or butted contact region/structure BCT, is a region in the IC layout diagram included in the manufacturing process as part of defining a metal line structure including one or more conductive materials, e.g., polysilicon, copper (Cu), aluminum (Al), tungsten (W), cobalt (Co), ruthenium (Ru), or one or more other metals or other suitable materials, in a given metal layer of the manufacturing process. In various embodiments, a metal region/segment corresponds to a first metal layer (also referred to as a metal zero layer in some embodiments), or a second or higher level metal layer of the manufacturing process.

A via region/structure, e.g., a via region/structure V1-V6, is a region in the IC layout diagram included in the manufacturing process as part of defining a via structure including one or more conductive materials configured to provide an electrical connection between an overlying conductive structure, e.g., a metal region/segment S1-S6, and an underlying conductive structure, e.g., a gate electrode of a gate region/structure G1-G4 or an MD region/segment MD1-MD6.

Via regions/structures and metal regions/segments correspond to manufacturing processes used to form features on either a frontside or backside of a semiconductor wafer, e.g., semiconductor wafer 100B. As depicted in FIG. 2B, memory cell 200 includes electrical connections to each of a frontside FS and a backside BS.

Frontside FS includes instances of metal regions/segments S1, S2, S5, and S6 and via regions/structures V1, V2, V5, and V6 configured as reference node/voltage VSS and word line/signal WL, instances of metal region/segment S3 and via region/structure V3 configured as a frontside bit line BLFS corresponding to one of bit lines BLL or BLU discussed above, and instances of metal region/segment S4 and via region/structure V4 configured as a frontside bit line BLBFS corresponding to one of bit lines BLBL or BLBU discussed above.

Backside BS includes instances of metal regions/segments S1, S2, S5, and S6 and via regions/structures V1, V2, V5, and V6 configured as power supply node/voltage VDD and word line/signal WLB, instances of metal region/segment S3 and via region/structure V3 configured as a backside bit line BLBS corresponding to one of bit lines BLL or BLU discussed above, and instances of metal region/segment S4 and via region/structure V4 configured as a backside bit line BLBBS corresponding to one of bit lines BLBL or BLBU discussed above.

Each instance of metal regions/segments S1-S6 is positioned in the lowermost metal layer of the corresponding frontside or backside location, and each instance of via regions/structures V1-V6 is configured to electrically connect the corresponding instance of metal regions/segments S1-S6 to a corresponding one of MD regions/segments MD1, MD3, MD4, or MD6 or gate regions/structures G1 or G4.

The instances of metal regions/segments S1, S3, S4, and S6 corresponding to power supply voltage node VDD, reference voltage node VSS, and bit lines BLFS, BLBS, BLBFS, and BLBBS extend across multiple instances of memory cell 200 in the X direction. The instances of metal regions/segments S2 and S5 corresponding to word lines WL and WLB extend partially across a given instance of memory cell 200 in the X direction and are electrically connected to overlying features (not shown for the purpose of clarity), e.g., via regions/structures and metal regions/segments extending in the Y direction.

MD region/segment MD1 corresponds to an MD instance configured to electrically connect a S/D region/structure of transistor N2 to reference voltage node VSS through corresponding frontside instances of via region/structure V1 and metal region/segment S1, and an MD instance configured to electrically connect a S/D region/structure of transistor P2 to power supply voltage node VDD through corresponding backside instances of via region/structure V1 and metal region/segment S1. The instances of MD region/segment MD1, via region/structure V1, and metal region/segment S1 are thereby configured to electrically connect each of reference voltage node VSS and power supply voltage node VDD to each of the instance of memory cell 200 depicted in FIG. 2B and to an adjacent, inverted instance of memory cell 200, if present.

MD region/segment MD6 corresponds to an MD instance configured to electrically connect a S/D region/structure of transistor N3 to reference voltage node VSS through corresponding frontside instances of via region/structure V6 and metal region/segment S6, and an MD instance configured to electrically connect a S/D region/structure of transistor P3 to power supply voltage node VDD through corresponding backside instances of via region/structure V6 and metal region/segment S6. The instances of MD region/segment MD6, via region/structure V6, and metal region/segment S6 are thereby configured to electrically connect each of reference voltage node VSS and power supply voltage node VDD to each of the instance of memory cell 200 depicted in FIG. 2B and to an adjacent, inverted instance of memory cell 200, if present.

MD region/segment MD2 is an MDLI configured to electrically connect S/D regions/structures shared by transistor pairs N1/N2 and P1/P2, through an instance of butted contact BCT, to gate region/structure G3 included in each of transistors N3 and P3, the combination of MD region/segment MD2, gate region/structure G3, and the instance of butted contact BCT thereby corresponding to node D1.

MD region/segment MD5 is an MDLI configured to electrically connect S/D regions/structures shared by transistor pairs N3/N4 and P3/P4, through an instance of butted contact BCT, to gate region/structure G2 included in each of transistors N2 and P2, the combination of MD region/segment MD5, gate region/structure G2, and the instance of butted contact BCT thereby corresponding to node D2.

In some embodiments, gate region/structure G1 is included in each of transistors N1 and P1, and MD region/segment MD3 is an MDLI configured to electrically connect S/D regions/structures of transistors N1 and P1 to one of bit lines BLFS or BLBS through corresponding frontside or backside instances of via region/structure V3 and metal region/segment S3. Gate region/structure G1 is electrically connected to a corresponding one of word line WL through frontside instances of via region/structure V2 and metal region/segment S2 or word line WLB through backside instances of via region/structure V2 and metal region/segment S2. Gate region/structure G1 and transistors N1 and P1 are thereby configured as a single pass gate capable of electrically connecting one of bit lines BLFS or BLBS to transistors N1 and P1 of each of the instance of memory cell 200 depicted in FIG. 2B and of an adjacent, inverted instance of memory cell 200, if present, responsive to a corresponding instance of word line signal WL or WLB.

Similarly, in some embodiments, gate region/structure G4 is included in each of transistors N4 and P4, and MD region/segment MD4 is an MDLI configured to electrically connect S/D regions/structures of transistors N4 and P4 to one of bit lines BLBFS or BLBBS through corresponding frontside or backside instances of via region/structure V4 and metal region/segment S4. Gate region/structure G4 is electrically connected to a corresponding one of word line WL through frontside instances of via region/structure V5 and metal region/segment S5 or word line WLB through backside instances of via region/structure V5 and metal region/segment S5. Gate region/structure G4 and transistors N4 and P4 are thereby configured as a single pass gate capable of electrically connecting one of bit lines BLBFS or BLBBS to transistors N4 and P4 of each of the instance of memory cell 200 depicted in FIG. 2B and of an adjacent, inverted instance of memory cell 200, if present, responsive to a corresponding instance of word line signal WL or WLB.

In some embodiments, an instance of memory cell 200 including single pass gates N1/P1 and N4/P4 configured as discussed above is referred to as a single-sided CFET SRAM cell.

In some embodiments, gate region/structure G1 includes electrically isolated portions included in transistors N1 and P1, and MD region/segment MD3 includes an MD instance configured to electrically connect the S/D region/structure of transistor N1 to bit line BLFS through frontside instances of via region/structure V3 and metal region/segment S3, and an MD instance configured to electrically connect the S/D region/structure of transistor P1 to bit line BLBS through backside instances of via region/structure V3 and metal region/segment S3. A portion of gate region/structure G1 is electrically connected to word line WL through frontside instances of via region/structure V2 and metal region/segment S2, and a portion of gate region/structure G1 is electrically connected to word line WLB through backside instances of via region/structure V2 and metal region/segment S2. Gate region/structure G1 and transistors N1 and P1 are thereby configured as a pass gate pair capable of electrically connecting bit line BLFS to transistor N1 of each of the instance of memory cell 200 depicted in FIG. 2B and of an adjacent, inverted instance of memory cell 200, if present, responsive to a corresponding instance of word line signal WL, and electrically connecting bit line BLBS to transistor P1 of each of the instance of memory cell 200 depicted in FIG. 2B and of an adjacent, inverted instance of memory cell 200, if present, responsive to a corresponding instance of word line signal WLB.

Similarly, in some embodiments, gate region/structure G4 includes electrically isolated portions included in transistors N4 and P4, and MD region/segment MD4 includes an MD instance configured to electrically connect the S/D region/structure of transistor N4 to bit line BLBFS through frontside instances of via region/structure V4 and metal region/segment S4, and an MD instance configured to electrically connect the S/D region/structure of transistor P4 to bit line BLBBS through backside instances of via region/structure V4 and metal region/segment S4. A portion of gate region/structure G4 is electrically connected to word line WL through frontside instances of via region/structure V5 and metal region/segment S5, and a portion of gate region/structure G4 is electrically connected to word line WLB through backside instances of via region/structure V5 and metal region/segment S5. Gate region/structure G4 and transistors N4 and P4 are thereby configured as a pass gate pair capable of electrically connecting bit line BLBFS to transistor N4 of each of the instance of memory cell 200 depicted in FIG. 2B and of an adjacent, inverted instance of memory cell 200, if present, responsive to a corresponding instance of word line signal WL, and electrically connecting bit line BLBBS to transistor P4 of each of the instance of memory cell 200 depicted in FIG. 2B and of an adjacent, inverted instance of memory cell 200, if present, responsive to a corresponding instance of word line signal WLB.

In some embodiments, an instance of memory cell 200 including pass gate pairs N1/P1 and N4/P4 configured as discussed above is referred to as a double-sided CFET SRAM cell, e.g., an IC layout diagram/device 300 or 400 including adjacent, inverted instances of memory cell 200 discussed below with respect to FIGS. 3A-4C.

By the configuration discussed above, instances of memory cell 200 enable bit line electrical connections divided into separate frontside and backside paths such that a memory circuit, e.g., memory macro 100 discussed above with respect to FIG. 1, is capable of realizing the benefits discussed above with respect to memory macro 100.

Figure 3A:
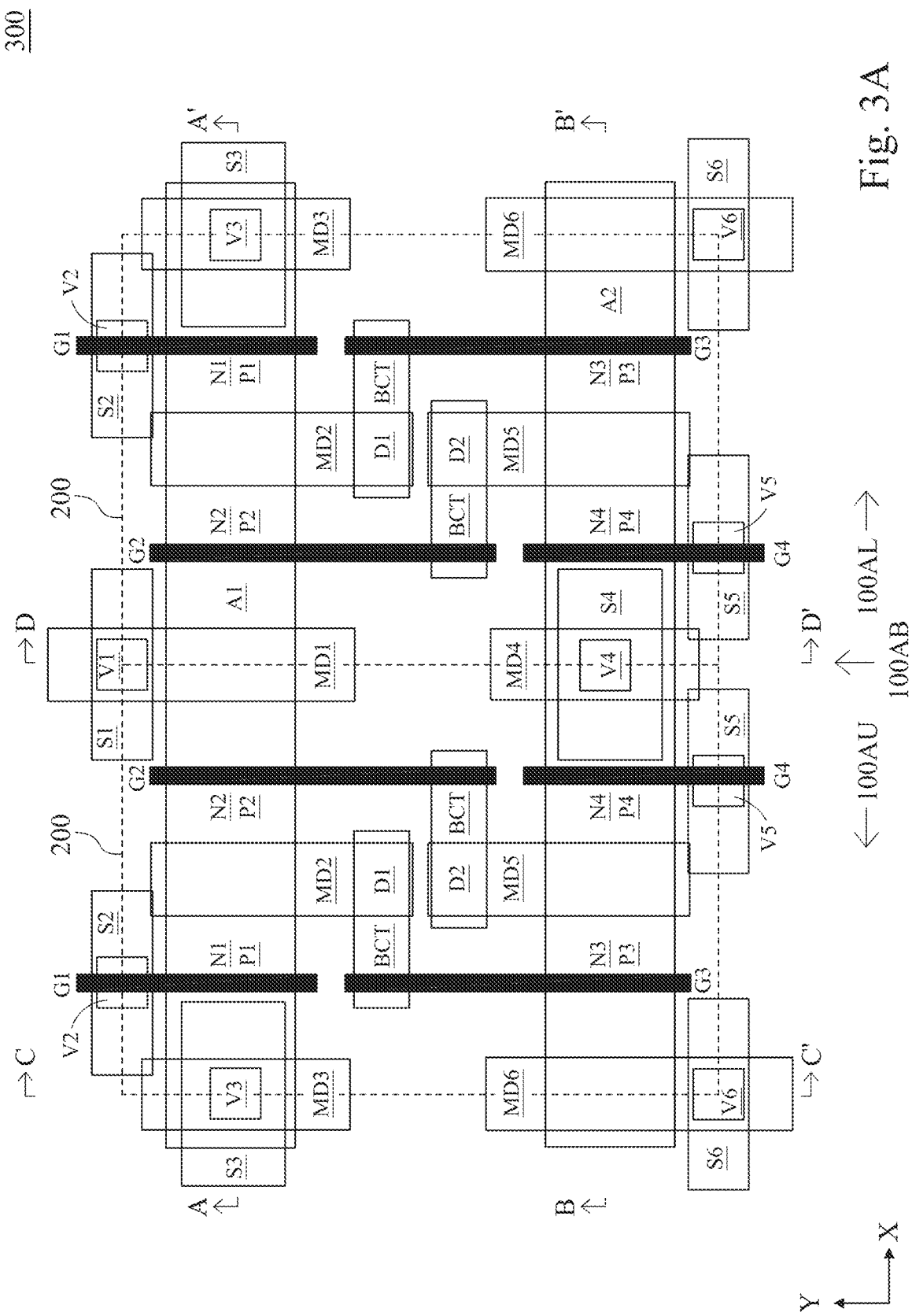
FIGS. 3A-3E are diagrams of an IC layout diagram and device, in accordance with some embodiments.
Figure 3B:
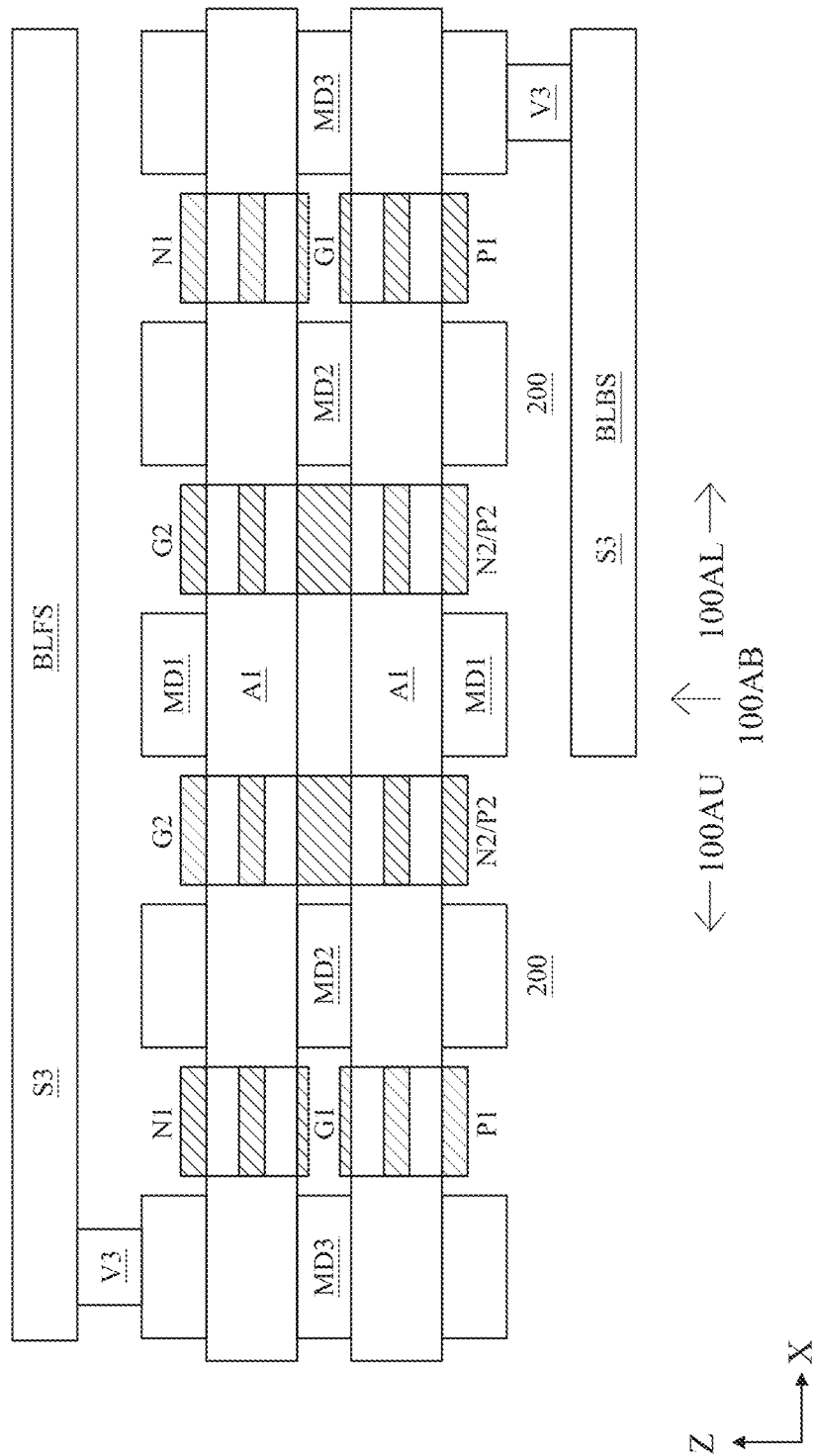
Figure 3C:
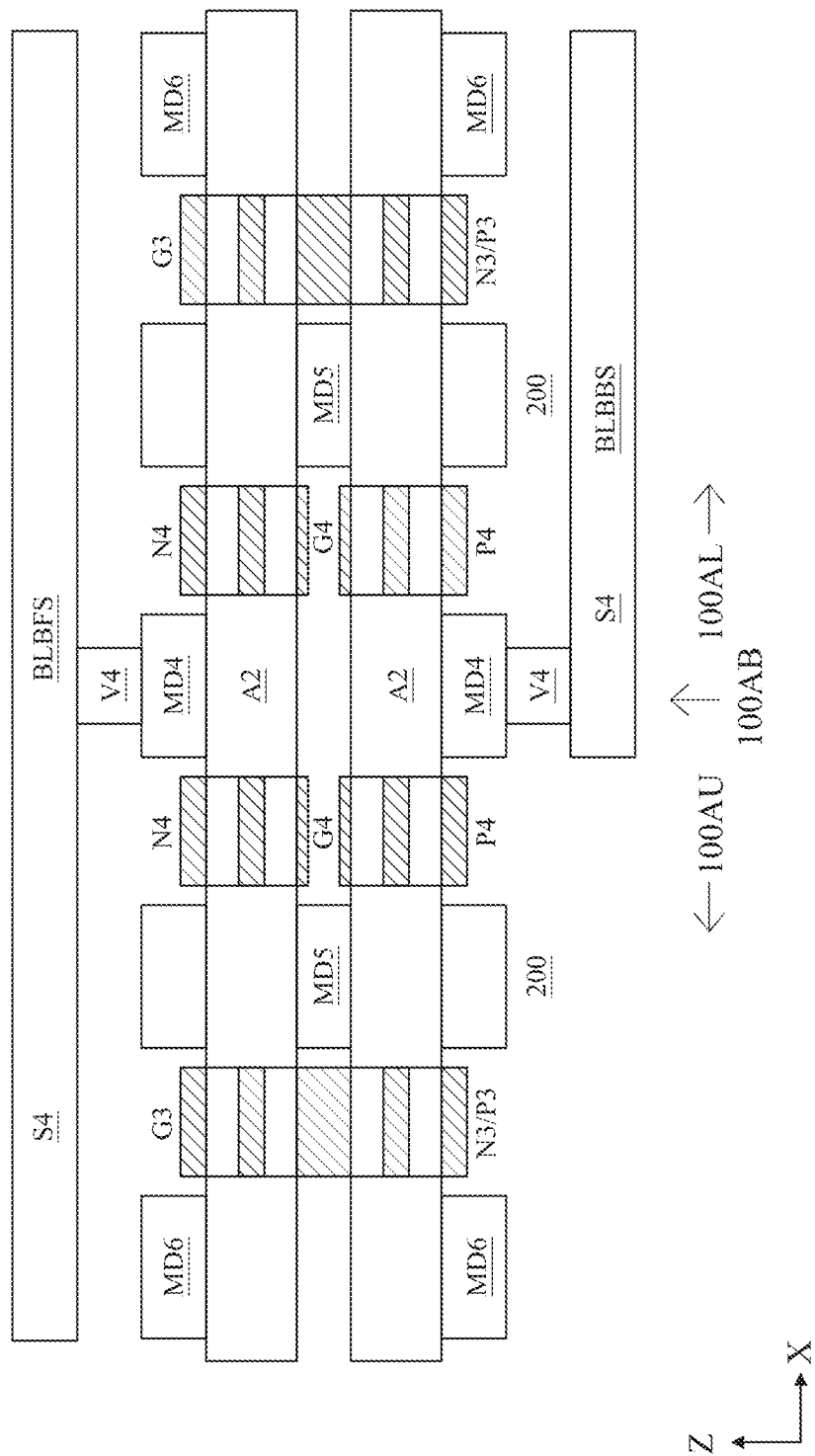
Figure 3D:
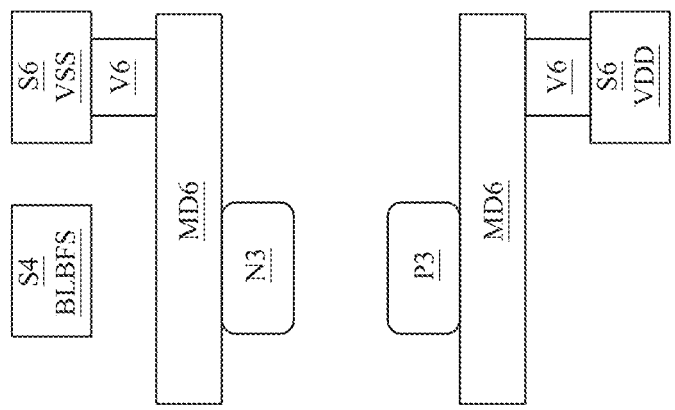
Figure 3D:
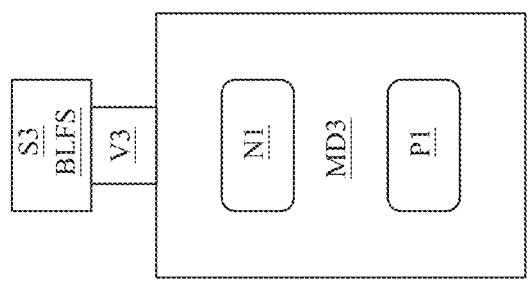
Figure 3E:
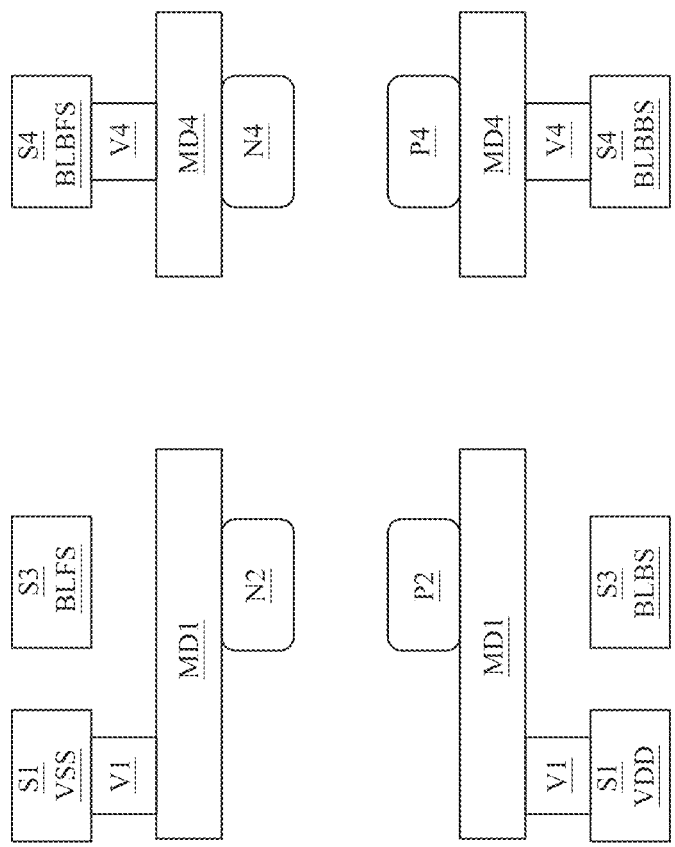

FIGS. 3A-3E depict IC layout diagram/device 300 including adjacent, inverted instances of IC layout diagram/device 200, in accordance with some embodiments. FIG. 3A depicts a plan view and the X and Y directions, FIG. 3B depicts a cross-sectional view along the X and Z directions in accordance with line A-A' of FIG. 3A, FIG. 3C depicts a cross-sectional view along the X and Z directions in accordance with line B-B' of FIG. 3A, FIG. 3D depicts a cross-sectional view along the Y and Z directions in accordance with line C-C' of FIG. 3A, and FIG. 3E depicts a cross-sectional view along the Y and Z directions in accordance with line D-D' of FIG. 3A. The discussion of IC layout diagram/device 300 below refers to features discussed above with respect to FIGS. 1-2B.

As depicted in FIGS. 3A-3E, IC layout diagram/device 300 includes each of the adjacent, inverted instances of memory cell 200 including the features discussed above in which instances of MD regions/segments MD1 and MD4, via regions/structures V1 and V4, and metal regions/segments S1 and S4 are shared at border 100AB and thereby included in each instance of memory cell 200.

An instance of memory cell 200 adjacent to border 100AB along the negative X direction is included in subset 100AU, and an instance of memory cell 200 adjacent to border 100AB along the positive X direction is included in subset 100AL.

In the embodiment depicted in FIGS. 3B-3E, bit lines BLFS and BLBS correspond to respective bit lines BLU and BLL, and bit lines BLBFS and BLBBS correspond to respective bit lines BLBU and BLBL. Each of backside bit lines BLBS and BLBBS extends along subset 100AL and terminates at border 100AB, and each of frontside bit lines BLFS and BLBFS extends along each of subsets 100AL and 100AU.

In subset 100AU, MD region/segment MD3 configured as an MDLI of the shared S/D regions/structures of transistor pair N1/P1 is electrically connected to bit line BLFS through frontside instances of via region/structure V3 and metal region/segment S3, and in subset 100AL, MD region/segment MD3 configured as an MDLI of the shared S/D regions/structures of transistor pair N1/P1 is electrically connected to bit line BLBS through backside instances of via region/structure V3 and metal region/segment S3. Each instance of transistor pair N1/P1 is thereby configured to be electrically coupled to a corresponding one of bit lines BLFS or BLBS.

At border 100AB, an instance of MD region/segment MD4 of single transistor N4 is electrically connected to bit line BLBFS through frontside instances of via region/structure V4 and metal region/segment S4, and an instance of MD region/segment MD4 of single transistor P4 is electrically connected to bit line BLBBS through backside instances of via region/structure V4 and metal region/segment S4. Each instance of stacked transistors N4 and P4 is thereby configured to be separately coupled to each of bit lines BLBFS and BLBBS.

As depicted in FIGS. 3A-3E, IC layout diagram/device 300 is thereby configured to include stacked transistors N4 and P4 configured as pass gates separately controllable through instances of gate region/structure G4 to selectively couple frontside and backside bit lines to node D2 of adjacent, inverted instances of memory cell 200.

In some embodiments, IC layout diagram/device 300 is otherwise configured to include stacked transistors, e.g., transistors N1 and P1, configured as pass gates separately controllable to selectively couple frontside and backside bit lines to a node, e.g., node D1, of adjacent, inverted instances of memory cell 200.

By including stacked pass gates configured to separately connect adjacent cells to either a frontside or backside bit line, IC layout diagram/device 300 enables support of a continuous border between the first and second subsets, thereby maintaining memory cell density compared to approaches in which a border between the first and second subsets does not include a cell capable of separate frontside and backside bit line connections.

Figure 4A:
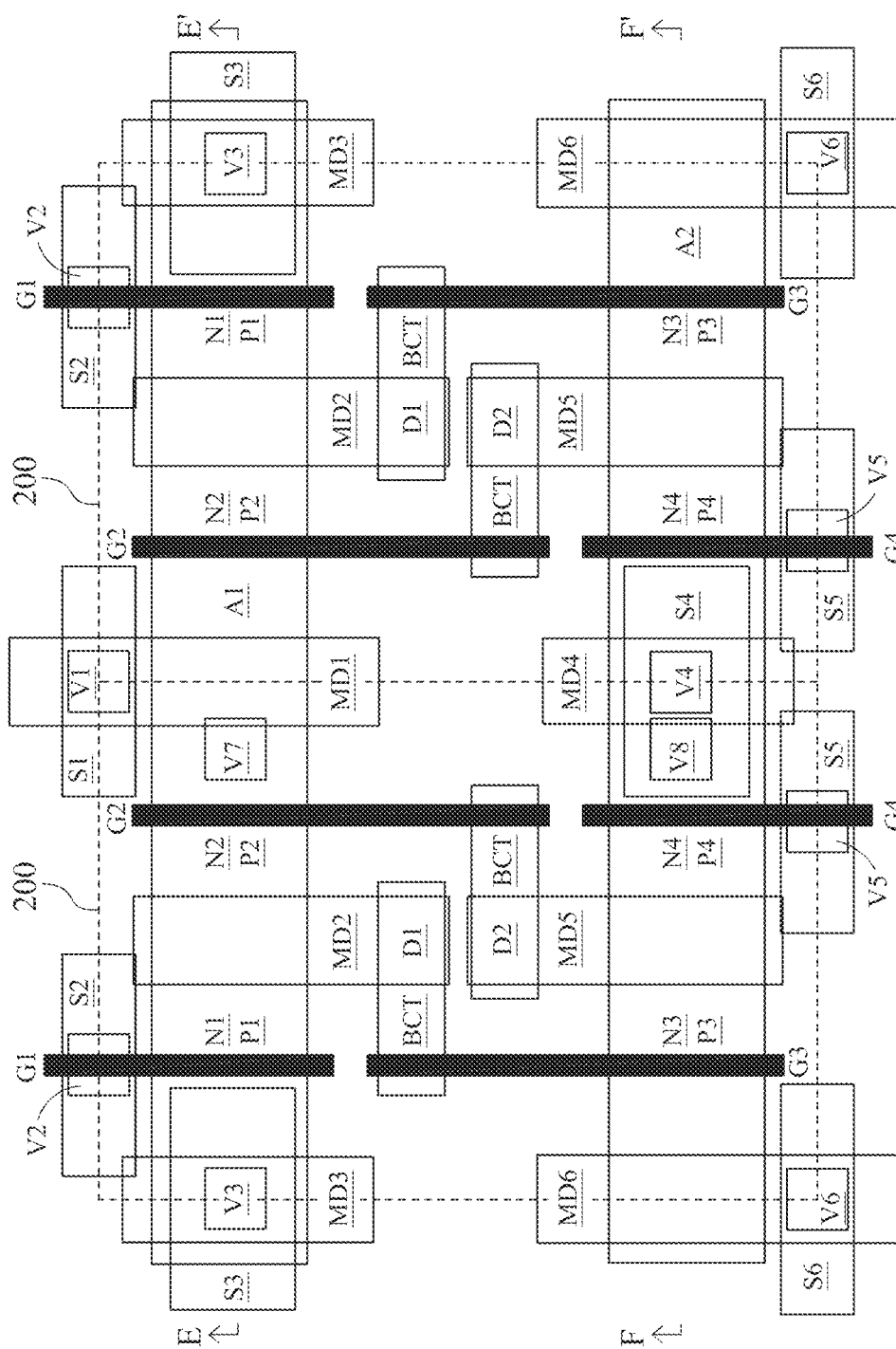
Figure 4B:
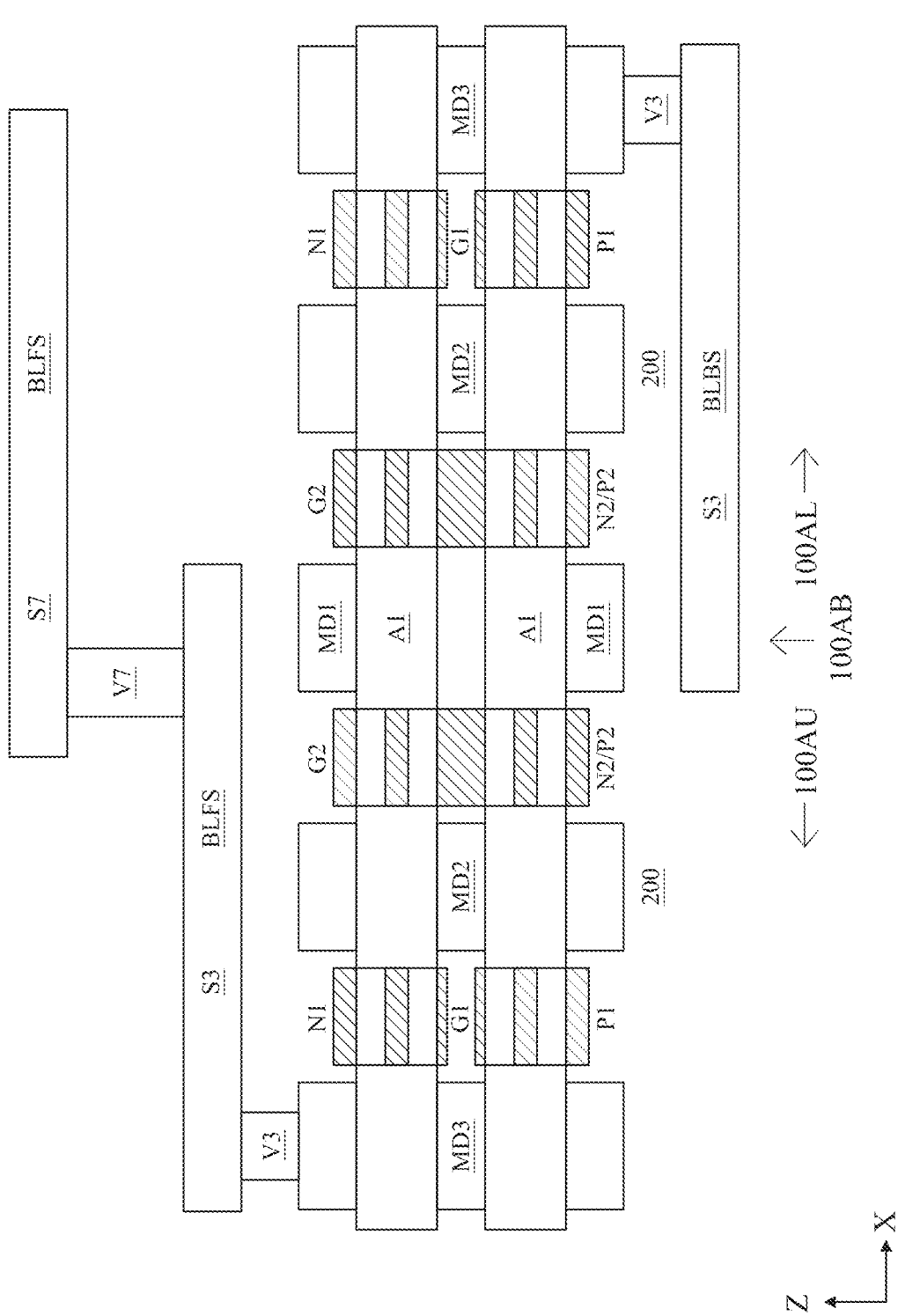

FIGS. 4A-4C depict IC layout diagram/device 400 including adjacent, inverted instances of IC layout diagram/device 200, in accordance with some embodiments. IC layout diagram/device 400 corresponds to IC layout diagram/device 300 discussed above with the exception of the reconfiguration of bit lines BLFS and BLBFS including the addition of via regions/structures V7 and V8 and metal regions/segments S7 and S8, as discussed below.

FIG. 4A depicts a plan view and the X and Y directions, FIG. 4B depicts a cross-sectional view along the X and Z directions in accordance with line E-E' of FIG. 4A, and FIG. 4C depicts a cross-sectional view along the X and Z directions in accordance with line F-F' of FIG. 4A. The discussion of IC layout diagram/device 400 below refers to features discussed above with respect to FIGS. 1-2B.

As depicted in FIGS. 4A-4C, IC layout diagram/device 400 includes via region/structures V7 and V8 at or near border 100AB configured to electrically connect corresponding frontside instances of metal regions/segments S3 and S4 to overlying metal regions/segments S7 and S8.

Each of metal regions/segments S7 and S8 corresponds to a third metal layer of the manufacturing process corresponding to IC layout diagram/device 400, and via regions/structures V7 and V8 correspond to a stack of via and metal features configured to electrically connect the instances of metal regions/segments S3 and S4 to the corresponding overlying metal regions/segments S7 and S8.

As depicted in FIGS. 4B and 4C, the instances of metal regions/segments S3 and S4 terminate at border 100AB, and metal regions/segments S7 and S8 extend in the positive X direction along subset 100AL.

The instances of metal regions/segments S3 and S7 and via region/structure V7 are thereby collectively configured as frontside bit line BLFS, and the instances of metal regions/segments S4 and S8 and via region/structure V8 are thereby collectively configured as frontside bit line BLBFS.

Compared to IC layout diagram/device 300 including frontside bit lines BLFS and BLBFS configured as discussed above, IC layout diagram/device 400 thereby includes frontside bit lines BLFS and BLBFS configured to reduce parasitic resistive and capacitive bit line loading such that speed and power performance are further improved during read and write operations with the tradeoff of reduced routing flexibility.

FIG. 5 is a flowchart of a method 500 of operating a memory macro, in accordance with some embodiments. Method 500 is capable of being performed on a memory macro, e.g., memory macro 100 discussed above with respect to FIGS. 1-4C.

The sequence in which the operations of method 500 are depicted in FIG. 5 is for illustration only; the operations of method 500 are capable of being executed simultaneously or in sequences that differ from that depicted in FIG. 5. In some embodiments, operations in addition to those depicted in FIG. 5 are performed before, between, during, and/or after the operations depicted in FIG. 5.

At operation 510, one of a frontside or backside bit line is used to perform a first read or write operation on a memory cell of a first subset of a column of memory cells.

In some embodiments, using the frontside or backside bit line to perform the first read or write operation on the memory cell of the first subset of a column of memory cells includes using one or more of bit lines BLU, BLBU, BLL, or BLBL to perform the first read or write operation on memory cell 110 of one of subset 100AL or 100AU of column 100C as discussed above with respect to FIG. 1.

In some embodiments, using the frontside or backside bit line to perform the first read or write operation on the memory cell includes using one or more of bit lines BLFS, BLBFS, BLBS, or BLBBS to perform the first read or write operation on memory cell 200 as discussed above with respect to FIGS. 2A-4C.

At operation 520, the other of the frontside or backside bit line is used to perform a second read or write operation on a memory cell of a second subset of the column of memory cells.

In some embodiments, using the frontside or backside bit line to perform the second read or write operation on the memory cell of a second subset of a column of memory cells includes using one or more of bit lines BLU, BLBU, BLL, or BLBL to perform the read or write operation on memory cell 110 of the other of subset 100AL or 100AU of column 100C as discussed above with respect to FIG. 1.

In some embodiments, using the frontside or backside bit line to perform the second read or write operation on the memory cell includes using one or more of bit lines BLFS, BLBFS, BLBS, or BLBBS to perform the second read or write operation on memory cell 200 as discussed above with respect to FIGS. 2A-4C

By executing some or all of the operations of method 500, read and write operations are performed using bit lines positioned on both sides of a semiconductor wafer, thereby enabling the realization of the benefits discussed above with respect to memory macro 100, memory cell 200, and IC layout diagrams/devices 300 and 400.

FIG. 6 is a flowchart of a method 600 of generating an IC layout diagram, in accordance with some embodiments. In some embodiments, generating the IC layout diagram includes generating one or more of IC layout diagrams 200, 300, or 400 discussed above with respect to FIGS. 2A-4C.

In some embodiments, some or all of method 600 is executed by a processor of a computer. In some embodiments, some or all of method 600 is executed by a processor 802 of IC layout diagram generation system 800, discussed below with respect to FIG. 8.

In some embodiments, one or more operations of method 600 are a subset of operations of a method of forming an IC device. In some embodiments, one or more operations of method 600 are a subset of operations of an IC manufacturing flow, e.g., an IC manufacturing flow discussed below with respect to manufacturing system 900 and FIG. 9.

In some embodiments, the operations of method 600 are performed in the order depicted in FIG. 6. In some embodiments, the operations of method 600 are performed simultaneously and/or in an order other than the order depicted in FIG. 6. In some embodiments, one or more operations are performed before, between, during, and/or after performing one or more operations of method 600.

At operation 610, a column of memory cells is arranged into a first subset positioned between a second subset and an I/O circuit of a memory macro. Arranging the column of memory cells includes arranging column 100C of memory cells 110 into subset 100AL positioned between subset 100AU and I/O circuit MIO of memory macro 100 discussed above with respect to FIG. 1.

In some embodiments, arranging the column of memory cells includes arranging memory cells 200 in accordance with one or more of IC layout diagrams 200-400 discussed above with respect to FIGS. 2A-4C.

At operation 620, a frontside metal region is configured extending from the I/O circuit to the second subset and including electrical connections to one of the first or second subsets. Configuring the frontside metal region from the I/O circuit to the second subset includes overlapping the frontside metal region with the first subset.

In some embodiments, configuring the frontside metal region includes configuring one or both of bit lines BLU or BLBU including electrical connections to subset 100AU or one or both of bit lines BLL or BLBL including electrical connections to subset 100AL, as discussed above with respect to FIG. 1.

In some embodiments, configuring the first frontside metal region from the I/O circuit to the second subset and overlapping the first subset includes configuring one of a pair of frontside metal regions from the I/O circuit to the second subset and overlapping the first subset, wherein each frontside metal region of the pair of frontside metal regions includes electrical connections to each memory cell of the one of the first or second subsets.

In some embodiments, configuring the first frontside metal region includes configuring the first frontside metal region in a lowermost frontside metal layer of the manufacturing process used to construct the memory macro in the semiconductor wafer.

In some embodiments, configuring the first frontside metal region includes configuring one or both of bit lines BLFS or BLBFS discussed above with respect to IC layout diagram/device 300 and FIGS. 3A-3E.

In some embodiments, the first frontside metal region includes electrical connections to each memory cell of the second subset, and configuring the first frontside metal region includes configuring the first frontside metal segment in a third frontside metal layer of the manufacturing process, configuring a third metal region in a lowermost frontside metal layer overlapping the second subset, and configuring a via region overlapping the first and third frontside metal regions.

In some embodiments, configuring the first frontside metal region includes configuring one or both of bit lines BLFS or BLBFS discussed above with respect to IC layout diagram/device 400 and FIGS. 4A-4C.

At operation 630, a backside metal region is configured extending from the I/O circuit to the second subset and including electrical connections to the other of the first or second subsets. Configuring the backside metal region from the I/O circuit to the second subset includes overlapping the backside metal region with the first subset.

In some embodiments, configuring the backside metal region includes configuring one or both of bit lines BLU or BLBU including electrical connections to subset 100AU or one or both of bit lines BLL or BLBL including electrical connections to subset 100AL, as discussed above with respect to FIG. 1.

In some embodiments, configuring the first backside metal region from the I/O circuit to the second subset and overlapping the first subset includes configuring one of a pair of backside metal regions from the I/O circuit to the second subset and overlapping the first subset, wherein each backside metal region of the pair of backside metal regions includes electrical connections to each memory cell of the one of the first or second subsets.

In some embodiments, configuring the first backside metal region includes configuring the first backside metal region in a lowermost backside metal layer of the manufacturing process.

In some embodiments, configuring the first backside metal region includes configuring one or both of bit lines BLBS or BLBBS discussed above with respect to IC layout diagram/devices 300 and 400 and FIGS. 3A-4C.

At operation 640, in some embodiments, the IC layout diagram is stored in a storage device. In some embodiments, storing the IC layout diagram in the storage device includes storing the IC layout diagram in an IC layout library, e.g., IC layout library 807 of IC layout diagram generation system 800, discussed below with respect to FIG. 8.

In some embodiments, storing the IC layout diagram in the storage device includes storing the IC layout diagram in a non-volatile, computer-readable memory or a cell library, e.g., a database, and/or includes storing the IC layout diagram over a network. In some embodiments, storing the IC layout diagram in the storage device includes storing the IC layout diagram over network 814 of EDA system 800, discussed below with respect to FIG. 8.

At operation 650, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 9.

By executing some or all of the operations of method 600, a memory macro is at least partially defined in which bit line electrical connections have separate frontside and backside paths, and is thereby capable of realizing the benefits discussed above with respect to memory macro 100 and IC layout diagrams/devices 200-400.

FIG. 7 is a flowchart of a method 700 of manufacturing an IC device, in accordance with some embodiments. Method 700 is operable to form one or more of memory macro 100 or IC devices 200-400 discussed above with respect to FIGS. 1-4C.

In some embodiments, the operations of method 700 are performed in the order depicted in FIG. 7. In some embodiments, the operations of method 700 are performed in an order other than the order depicted in FIG. 7. In some embodiments, one or more additional operations are performed before, during, and/or after the operations of method 700. In some embodiments, performing some or all of the operations of method 700 includes performing one or more operations as discussed below with respect to IC manufacturing system 900 and FIG. 9.

At operation 710, in some embodiments, a column of memory cells including a first subset positioned between a second subset and an I/O circuit is constructed in a semiconductor wafer. Constructing the column includes constructing each of the first and second subsets being contiguous memory cells of a memory macro.

In some embodiments, constructing the column of memory cells includes constructing subsets 100AL and 100AU, subset 100AL being between subset 100AU and I/O circuit MIO of memory macro 100 discussed above with respect to FIG. 1.

In some embodiments, constructing the first and second subsets includes constructing first and second subsets of CFET SRAM cells including forming a frontside via structure on each corresponding CFET SRAM cell of one of the first or second subsets of CFET SRAM cells and forming a backside via structure on each corresponding CFET SRAM cell of the other of the first or second subset of CFET SRAM cells.

In some embodiments, constructing the column of memory cells comprises constructing memory cells 200 in accordance with one or more of IC layout diagrams/devices 200-400 discussed above with respect to FIGS. 2A-4C.

In various embodiments, constructing the column of memory cells includes performing a plurality of manufacturing operations, e.g., one or more of a lithography, diffusion, deposition, etching, planarizing, or other operation suitable for depositing and forming one or more active areas, gate, S/D, and via structures configured as discussed above with respect to FIGS. 1-4C.

At operation 720, a frontside metal segment is formed from the I/O circuit to the second subset and electrically connected to one of the first or second subsets. Forming the frontside metal segment from the I/O circuit to the second subset includes forming the frontside metal segment over the first subset.

In some embodiments, forming the frontside metal segment includes forming one or both of bit lines BLU or BLBU electrically connected to subset 100AU or one or both of bit lines BLL or BLBL electrically connected to subset 100AL, as discussed above with respect to FIG. 1.

In some embodiments, forming the first frontside metal segment from the I/O circuit to the second subset and over the first subset includes forming one of a pair of frontside metal segments from the I/O circuit to the second subset and over the first subset, wherein each frontside metal segment of the pair of frontside metal segments is electrically connected to each memory cell of the one of the first or second subsets.

In some embodiments, forming the first frontside metal segment includes forming the first frontside metal segment in a lowermost frontside metal layer of the manufacturing process used to construct the memory macro in the semiconductor wafer.

In some embodiments, forming the first frontside metal segment includes forming one or both of bit lines BLFS or BLBFS discussed above with respect to IC layout diagram/device 300 and FIGS. 3A-3E.

In some embodiments, the first frontside metal segment is electrically connected to each memory cell of the second subset, and forming the first frontside metal segment includes forming the first frontside metal segment in a third frontside metal layer of the manufacturing process, forming a third metal segment in a lowermost frontside metal layer of the semiconductor wafer over the second subset, and forming a via structure between the first and third frontside metal segments.

In some embodiments, forming the first frontside metal segment includes forming one or both of bit lines BLFS or BLBFS discussed above with respect to IC layout diagram/device 400 and FIGS. 4A-4C.

In various embodiments, forming the frontside metal segment includes performing a plurality of manufacturing operations, e.g., one or more of a lithography, diffusion, deposition, etching, planarizing, or other operation suitable for constructing isolation structures in accordance with the configurations discussed above with respect to FIGS. 2A-4C.

At operation 730, a backside metal segment is formed from the I/O circuit to the second subset and electrically connected to the other of the first or second subsets. Forming the backside metal segment from the I/O circuit to the second subset includes forming the backside metal segment over the first subset.

In some embodiments, forming the backside metal segment includes forming one or both of bit lines BLU or BLBU electrically connected to subset 100AU or one or both of bit lines BLL or BLBL electrically connected to subset 100AL, as discussed above with respect to FIG. 1.

In some embodiments, forming the first backside metal segment from the I/O circuit to the second subset and over the first subset includes forming one of a pair of backside metal segments from the I/O circuit to the second subset and over the first subset, wherein each backside metal segment of the pair of backside metal segments is electrically connected to each memory cell of the other of the first or second subsets.

In some embodiments, forming the first backside metal segment includes forming the first backside metal segment in a lowermost backside metal layer of the manufacturing process used to construct the memory macro in the semiconductor wafer.

In some embodiments, forming the first backside metal segment includes forming one or both of bit lines BLBS or BLBBS discussed above with respect to IC devices 300 and 400 and FIGS. 3A-4C.

In various embodiments, forming the first backside metal segment includes performing a plurality of manufacturing operations, e.g., one or more of a lithography, diffusion, deposition, etching, planarizing, or other operation suitable for constructing metal lines in accordance with the configurations discussed above with respect to FIGS. 2A-5.

At operation 740, in some embodiments, additional electrical connections are constructed configured to include the memory cells in a memory macro.

In some embodiments, constructing the additional electrical connections includes constructing the additional electrical connections configured to include memory cells 110 in memory macro 100 discussed above with respect to FIG. 1.

In various embodiments, forming the additional electrical connections includes performing a plurality of manufacturing operations, e.g., one or more of a lithography, diffusion, deposition, etching, planarizing, or other operation suitable for constructing vias and metal segments.

By performing some or all of the operations of method 700, a memory macro is formed in which bit line electrical connections have separate frontside and backside paths, and is thereby capable of realizing the benefits discussed above with respect to memory macro 100 and IC layout diagrams/devices 200-400.

FIG. 8 is a block diagram of IC layout diagram generation system 800, in accordance with some embodiments. Methods described herein of designing IC layout diagrams in accordance with one or more embodiments are implementable, for example, using IC layout diagram generation system 800, in accordance with some embodiments.

In some embodiments, IC layout diagram generation system 800 is a general purpose computing device including a hardware processor 802 and a non-transitory, computer-readable storage medium 804. Storage medium 804, amongst other things, is encoded with, i.e., stores, computer program code 806, i.e., a set of executable instructions. Execution of instructions 806 by hardware processor 802 represents (at least in part) an EDA tool which implements a portion or all of a method, e.g., method 600 of generating an IC layout diagram described above with respect to FIGS. 1-5 (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause IC layout diagram generation system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, computer-readable storage medium 804 stores computer program code 806 configured to cause IC layout diagram generation system 800 (where such execution represents (at least in part) the EDA tool) to be usable for performing a portion or all of the noted processes and/or methods. In one or more embodiments, computer-readable storage medium 804 also stores information which facilitates performing a portion or all of the noted processes and/or methods. In one or more embodiments, computer-readable storage medium 804 stores IC layout library 807 of IC layout diagrams including such IC layout diagrams as disclosed herein, e.g., IC layout diagrams 200-400 discussed above with respect to FIGS. 1-4C.

IC layout diagram generation system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

IC layout diagram generation system 800 also includes network interface 812 coupled to processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC layout diagram generation systems 800.

IC layout diagram generation system 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. IC layout diagram generation system 800 is configured to receive information related to a UI through I/O interface 810. The information is stored in computer-readable medium 804 as user interface (UI) 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC layout diagram generation system 800. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

FIG. 9 is a block diagram of IC manufacturing system 900, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 900.

In FIG. 9, IC manufacturing system 900 includes entities, such as a design house 920, a mask house 930, and an IC manufacturer/fabricator ("fab") 950, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 950 is owned by a single larger company. In some embodiments, two or more of design house 920, mask house 930, and IC fab 950 coexist in a common facility and use common resources.

Design house (or design team) 920 generates an IC design layout diagram 922. IC design layout diagram 922 includes various geometrical patterns, e.g., an IC layout diagram 200-400 discussed above with respect to FIGS. 1-4C. The geometrical patterns correspond to patterns of metal, oxide, or semiconductor layers that make up the various components of IC device 960 to be fabricated. The various layers combine to form various IC features. For example, a portion of IC design layout diagram 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout diagram 922. The design procedure includes one or more of logic design, physical design or place and route. IC design layout diagram 922 is presented in one or more data files having information of the geometrical patterns. For example, IC design layout diagram 922 can be expressed in a GDSII file format or DFII file format.

Mask house 930 includes data preparation 932 and mask fabrication 944. Mask house 930 uses IC design layout diagram 922 to manufacture one or more masks 945 to be used for fabricating the various layers of IC device 960 according to IC design layout diagram 922. Mask house 930 performs mask data preparation 932, where IC design layout diagram 922 is translated into a representative data file (RDF). Mask data preparation 932 provides the RDF to mask fabrication 944. Mask fabrication 944 includes a mask writer. A mask writer converts the RDF to an image on a substrate, such as a mask (reticle) 945 or a semiconductor wafer 953. The design layout diagram 922 is manipulated by mask data preparation 932 to comply with particular characteristics of the mask writer and/or requirements of IC fab 950. In FIG. 9, mask data preparation 932 and mask fabrication 944 are illustrated as separate elements. In some embodiments, mask data preparation 932 and mask fabrication 944 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout diagram 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout diagram 922 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 922 to compensate for limitations during mask fabrication 944, which may undo part of the modifications performed by OPC in order to meet mask creation rules.

In some embodiments, mask data preparation 932 includes lithography process checking (LPC) that simulates processing that will be implemented by IC fab 950 to fabricate IC device 960. LPC simulates this processing based on IC design layout diagram 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 922.

It should be understood that the above description of mask data preparation 932 has been simplified for the purposes of clarity. In some embodiments, data preparation 932 includes additional features such as a logic operation (LOP) to modify the IC design layout diagram 922 according to manufacturing rules. Additionally, the processes applied to IC design layout diagram 922 during data preparation 932 may be executed in a variety of different orders.

After mask data preparation 932 and during mask fabrication 944, a mask 945 or a group of masks 945 are fabricated based on the modified IC design layout diagram 922. In some embodiments, mask fabrication 944 includes performing one or more lithographic exposures based on IC design layout diagram 922. In some embodiments, an electron-beam (e-beam) or a mechanism of multiple e-beams is used to form a pattern on a mask (photomask or reticle) 945 based on the modified IC design layout diagram 922. Mask 945 can be formed in various technologies. In some embodiments, mask 945 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 945 includes a transparent substrate (e.g., fused quartz) and an opaque material (e.g., chromium) coated in the opaque regions of the binary mask. In another example, mask 945 is formed using a phase shift technology. In a phase shift mask (PSM) version of mask 945, various features in the pattern formed on the phase shift mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in semiconductor wafer 953, in an etching process to form various etching regions in semiconductor wafer 953, and/or in other suitable processes.

IC fab 950 is an IC fabrication business that includes one or more manufacturing facilities for the fabrication of a variety of different IC products. In some embodiments, IC Fab 950 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 950 includes wafer fabrication tools 952 configured to execute various manufacturing operations on semiconductor wafer 953 such that IC device 960 is fabricated in accordance with the mask(s), e.g., mask 945. In various embodiments, fabrication tools 952 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 950 uses mask(s) 945 fabricated by mask house 930 to fabricate IC device 960. Thus, IC fab 950 at least indirectly uses IC design layout diagram 922 to fabricate IC device 960. In some embodiments, semiconductor wafer 953 is fabricated by IC fab 950 using mask(s) 945 to form IC device 960. In some embodiments, the IC fabrication includes performing one or more lithographic exposures based at least indirectly on IC design layout diagram 922. Semiconductor wafer 953 includes a silicon substrate or other proper substrate having material layers formed thereon. Semiconductor wafer 953 further includes one or more of various doped regions, dielectric features, multi-level interconnects, and the like (formed at subsequent manufacturing steps).

In some embodiments, a memory macro includes an I/O circuit positioned in a semiconductor wafer, a column of memory cells including first and second subsets of contiguous memory cells extending away from the I/O circuit in the semiconductor wafer, wherein the first subset is positioned between the I/O circuit and the second subset, a first bit line coupled to the I/O circuit and extending on one of a frontside or a backside of the semiconductor wafer along the first subset and terminating at the second subset, and a second bit line coupled to the I/O circuit and extending on the other of the frontside or the backside along the first and second subsets, wherein each memory cell of the first subset is electrically connected to the first bit line, and each memory cell of the second subset is electrically connected to the second bit line. In some embodiments, the first bit line is one of a first bit line pair coupled to the I/O circuit and extending on the one of the frontside or the backside along the first subset and terminating at the second subset, the second bit line is one of a second bit line pair coupled to the I/O circuit and extending on the other of the frontside or the backside along the first and second subsets, each memory cell of the first subset is electrically connected to each bit line of the first bit line pair, and each memory cell of the second subset is electrically connected to each bit line of the second bit line pair. In some embodiments, the first bit line includes a metal segment extending from the I/O circuit in a lowermost backside metal layer. In some embodiments, the second bit line includes a first metal segment extending from the I/O circuit in a lowermost frontside metal layer along the first and second subsets. In some embodiments, the second bit line includes a first metal segment extending from the I/O circuit along the first subset to the second subset in a first frontside metal layer, a second metal segment extending in a lowermost frontside metal layer along the second subset away from the first subset, and a via structure configured to electrically connect the first and second metal segments at a border between the first and second subsets. In some embodiments, each memory cell of the column of memory cells includes a CFET SRAM cell, each CFET SRAM cell of the first subset includes one of a corresponding frontside or backside via configured to electrically connect the CFET SRAM cell to the first bit line, and each CFET SRAM cell of the second subset includes the other of the corresponding frontside or backside via configured to electrically connect the CFET SRAM cell to the second bit line. In some embodiments, the I/O circuit is configured to perform a read operation and a write operation on a memory cell of the first subset using the first bit line, and perform the read operation and the write operation on a memory cell of the second subset using the second bit line.

In some embodiments, an IC device includes a first bit line extending in a first direction along a frontside of a semiconductor wafer, a second bit line extending in the first direction along a backside of the semiconductor wafer, and first and second CFET SRAM cells positioned between the first and second bit lines, wherein the first CFET SRAM cell includes a first frontside via structure configured to electrically connect a first pass gate of the first CFET SRAM cell to the first bit line, the second CFET SRAM cell includes a first backside via structure configured to electrically connect a second pass gate of the second CFET SRAM cell to the second bit line, and the frontside and backside via structures are aligned in a direction perpendicular to the first direction. In some embodiments, the first pass gate includes an n-type FET and the second pass gate includes a p-type FET. In some embodiments, the first pass gate includes a first gate structure electrically connected to a frontside word line, and the second pass gate includes a second gate structure electrically separated from the first gate structure and electrically connected to a backside word line. In some embodiments, the IC device includes a third bit line extending in the first direction along the frontside of the semiconductor wafer and a fourth bit line extending in the first direction along the backside of the semiconductor wafer, the first CFET SRAM cell includes a second frontside via structure configured to electrically connect a third pass gate of the first CFET SRAM cell to the third bit line, and the second CFET SRAM cell includes a second backside via structure configured to electrically connect a fourth pass gate of the second CFET SRAM cell to the fourth bit line. In some embodiments, the IC device includes a plurality of first CFET SRAM cells including the first CFET SRAM cell and a plurality of second CFET SRAM cells including the second CFET SRAM cell, each first CFET SRAM cell of the plurality of first CFET SRAM cells includes a corresponding first frontside via structure configured to electrically connect a corresponding first pass gate of the first CFET SRAM cell to the first bit line, and each second CFET SRAM cell of the plurality of second CFET SRAM cells includes a corresponding first backside via structure configured to electrically connect a corresponding second pass gate of the second CFET SRAM cell to the second bit line. In some embodiments, the first bit line includes a first metal segment extending in the first direction in a lowermost frontside metal layer, and the second bit line includes a second metal segment extending in the first direction in a lowermost backside metal layer. In some embodiments, the first bit line includes a third metal segment extending in the first direction and overlying the first metal segment and a via structure configured to electrically connect the first and third metal segments to each other.

In some embodiments, a method of forming a memory macro includes constructing a column of memory cells in a semiconductor wafer, wherein constructing the column of memory cells includes constructing first and second subsets of contiguous memory cells and the first subset is positioned between the second subset and an I/O circuit of the memory macro, forming a first frontside metal segment from the I/O circuit to the second subset and over the first subset, wherein the first frontside metal segment is electrically connected to each memory cell of one of the first or second subsets, and forming a first backside metal segment from the I/O circuit to the second subset and over the first subset, wherein the first backside metal segment is electrically connected to each memory cell of the other of the first or second subsets. In some embodiments, forming the first frontside metal segment includes forming the first frontside metal segment in a lowermost frontside metal layer of the semiconductor wafer. In some embodiments, the first frontside metal segment is electrically connected to each memory cell of the second subset, forming the first frontside metal segment includes forming the first frontside metal segment in a third frontside metal layer of the semiconductor wafer, and the method includes forming a third metal segment in a lowermost frontside metal layer of the semiconductor wafer over the second subset and forming a via structure between the first and third frontside metal segments. In some embodiments, forming the first backside metal segment includes forming the first backside metal segment in a lowermost backside metal layer of the semiconductor wafer. In some embodiments, forming the first frontside metal segment from the I/O circuit to the second subset and over the first subset includes forming one of a pair of frontside metal segments from the I/O circuit to the second subset and over the first subset, wherein each frontside metal segment of the pair of frontside metal segments is electrically connected to each memory cell of the one of the first or second subsets, and forming the first backside metal segment from the I/O circuit to the second subset and over the first subset includes forming one of a pair of backside metal segments from the I/O circuit to the second subset and over the first subset, wherein each backside metal segment of the pair of backside metal segments is electrically connected to each memory cell of the other of the first or second subsets. In some embodiments, constructing the first and second subsets of memory cells includes constructing first and second subsets of CFET SRAM cells, constructing the one of the first or second subsets of CFET SRAM cells includes forming a frontside via structure on each corresponding CFET SRAM cell, and constructing the other of the first or second subset of CFET SRAM cells includes forming a backside via structure on each corresponding CFET SRAM cell.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory macro comprising:
   an input/output (I/O) circuit positioned in a semiconductor wafer;
   a column of memory cells comprising first and second subsets of contiguous memory cells extending away from the I/O circuit in the semiconductor wafer, wherein the first subset is positioned between the I/O circuit and the second subset;
   a first bit line coupled to the I/O circuit and extending on one of a frontside or a backside of the semiconductor wafer along the first subset and terminating at the second subset; and
   a second bit line coupled to the I/O circuit and extending on the other of the frontside or the backside along the first and second subsets,
   wherein
      each memory cell of the first subset is electrically connected to the first bit line, and
      each memory cell of the second subset is electrically connected to the second bit line.

2. The memory macro of claim 1, wherein
   the first bit line is one of a first bit line pair coupled to the I/O circuit and extending on the one of the frontside or the backside along the first subset and terminating at the second subset,
   the second bit line is one of a second bit line pair coupled to the I/O circuit and extending on the other of the frontside or the backside along the first and second subsets,
   each memory cell of the first subset is electrically connected to each bit line of the first bit line pair, and
   each memory cell of the second subset is electrically connected to each bit line of the second bit line pair.

3. The memory macro of claim 1, wherein the first bit line comprises a metal segment extending from the I/O circuit in a lowermost backside metal layer.

4. The memory macro of claim 1, wherein the second bit line comprises a first metal segment extending from the I/O circuit in a lowermost frontside metal layer along the first and second subsets.

5. The memory macro of claim 1, wherein the second bit line comprises:
   a first metal segment extending from the I/O circuit along the first subset to the second subset in a first frontside metal layer;
   a second metal segment extending in a lowermost frontside metal layer along the second subset away from the first subset; and
   a via structure configured to electrically connect the first and second metal segments at a border between the first and second subsets.

6. The memory macro of claim 1, wherein
   each memory cell of the column of memory cells comprises a complementary field-effect transistor (CFET) static random-access memory (SRAM) cell,
   each CFET SRAM cell of the first subset comprises one of a corresponding frontside or backside via configured to electrically connect the CFET SRAM cell to the first bit line, and
   each CFET SRAM cell of the second subset comprises the other of the corresponding frontside or backside via configured to electrically connect the CFET SRAM cell to the second bit line.

7. The memory macro of claim 1, wherein the I/O circuit is configured to
   perform a read operation and a write operation on a memory cell of the first subset using the first bit line, and
   perform the read operation and the write operation on a memory cell of the second subset using the second bit line.

8. An integrated circuit (IC) device comprising:
   a first bit line extending in a first direction along a frontside of a semiconductor wafer;
   a second bit line extending in the first direction along a backside of the semiconductor wafer; and
   first and second complementary field-effect transistor (CFET) static random-access memory (SRAM) cells positioned between the first and second bit lines,
   wherein
      the first CFET SRAM cell comprises a first frontside via structure configured to electrically connect a first pass gate of the first CFET SRAM cell to the first bit line,
      the second CFET SRAM cell comprises a first backside via structure configured to electrically connect a second pass gate of the second CFET SRAM cell to the second bit line, and
      the frontside and backside via structures are aligned in a direction perpendicular to the first direction.

9. The IC device of claim 8, wherein
   the first pass gate comprises an n-type FET, and
   the second pass gate comprises a p-type FET.

10. The IC device of claim 8, wherein
    the first pass gate comprises a first gate structure electrically connected to a frontside word line, and
    the second pass gate comprises a second gate structure electrically separated from the first gate structure and electrically connected to a backside word line.

11. The IC device of claim 8, further comprising:
    a third bit line extending in the first direction along the frontside of the semiconductor wafer; and
    a fourth bit line extending in the first direction along the backside of the semiconductor wafer,
    wherein
       the first CFET SRAM cell further comprises a second frontside via structure configured to electrically connect a third pass gate of the first CFET SRAM cell to the third bit line, and
       the second CFET SRAM cell further comprises a second backside via structure configured to electrically connect a fourth pass gate of the second CFET SRAM cell to the fourth bit line.

12. The IC device of claim 8, further comprising:
    a plurality of first CFET SRAM cells comprising the first CFET SRAM cell; and
    a plurality of second CFET SRAM cells comprising the second CFET SRAM cell,
    wherein
       each first CFET SRAM cell of the plurality of first CFET SRAM cells comprises a corresponding first frontside via structure configured to electrically connect a corresponding first pass gate of the first CFET SRAM cell to the first bit line, and
       each second CFET SRAM cell of the plurality of second CFET SRAM cells comprises a corresponding first backside via structure configured to electrically connect a corresponding second pass gate of the second CFET SRAM cell to the second bit line.

13. The IC device of claim 8, wherein
the first bit line comprises a first metal segment extending in the first direction in a lowermost frontside metal layer, and
the second bit line comprises a second metal segment extending in the first direction in a lowermost backside metal layer.

14. The IC device of claim 13, wherein the first bit line further comprises:
a third metal segment extending in the first direction and overlying the first metal segment; and
a via structure configured to electrically connect the first and third metal segments to each other.

15. A method of manufacturing a memory macro, the method comprising:
constructing a column of memory cells in a semiconductor wafer, wherein
the constructing the column of memory cells comprises constructing first and second subsets of contiguous memory cells, and
the first subset is positioned between the second subset and an I/O circuit of the memory macro;
forming a first frontside metal segment from the I/O circuit to the second subset and over the first subset, wherein the first frontside metal segment is electrically connected to each memory cell of one of the first or second subsets; and
forming a first backside metal segment from the I/O circuit to the second subset and over the first subset, wherein the first backside metal segment is electrically connected to each memory cell of the other of the first or second subsets.

16. The method of claim 15, wherein the forming the first frontside metal segment comprises forming the first frontside metal segment in a lowermost frontside metal layer of the semiconductor wafer.

17. The method of claim 15, wherein
the first frontside metal segment is electrically connected to each memory cell of the second subset,
the forming the first frontside metal segment comprises forming the first frontside metal segment in a third frontside metal layer of the semiconductor wafer, and
the method further comprises:
forming a third metal segment in a lowermost frontside metal layer of the semiconductor wafer over the second subset; and
forming a via structure between the first and third frontside metal segments.

18. The method of claim 15, wherein the forming the first backside metal segment comprises forming the first backside metal segment in a lowermost backside metal layer of the semiconductor wafer.

19. The method of claim 15, wherein
the forming the first frontside metal segment from the I/O circuit to the second subset and over the first subset comprises forming one of a pair of frontside metal segments from the I/O circuit to the second subset and over the first subset, wherein each frontside metal segment of the pair of frontside metal segments is electrically connected to each memory cell of the one of the first or second subsets, and
the forming the first backside metal segment from the I/O circuit to the second subset and over the first subset comprises forming one of a pair of backside metal segments from the I/O circuit to the second subset and over the first subset, wherein each backside metal segment of the pair of backside metal segments is electrically connected to each memory cell of the other of the first or second subsets.

20. The method of claim 15, wherein
the constructing the first and second subsets of memory cells comprises constructing first and second subsets of complementary field-effect transistor (CFET) static random-access memory (SRAM) cells,
the constructing the one of the first or second subsets of CFET SRAM cells comprises forming a frontside via structure on each corresponding CFET SRAM cell, and
the constructing the other of the first or second subset of CFET SRAM cells comprises forming a backside via structure on each corresponding CFET SRAM cell.

* * * * *